(12) United States Patent
Li et al.

(10) Patent No.: US 11,982,792 B2
(45) Date of Patent: May 14, 2024

(54) CAMERA LENS ASSEMBLY

(71) Applicant: Zhejiang Sunny Optics Co., Ltd, Yuyao (CN)

(72) Inventors: Yang Li, Yuyao (CN); Haidong Xiao, Yuyao (CN); Kaiyuan Zhang, Yuyao (CN); Fujian Dai, Yuyao (CN); Liefeng Zhao, Yuyao (CN)

(73) Assignee: Zhejiang Sunny Optics Co., Ltd (CN)

( * ) Notice: Subject to any disclaimer, the term of this patent is extended or adjusted under 35 U.S.C. 154(b) by 662 days.

(21) Appl. No.: 17/160,324

(22) Filed: Jan. 27, 2021

(65) Prior Publication Data
US 2021/0286153 A1    Sep. 16, 2021

(30) Foreign Application Priority Data

Mar. 12, 2020 (CN) .......................... 202010169586.X

(51) Int. Cl.
*G02B 13/00* (2006.01)
*G02B 9/62* (2006.01)
*G02B 27/00* (2006.01)

(52) U.S. Cl.
CPC ........... *G02B 13/0045* (2013.01); *G02B 9/62* (2013.01); *G02B 27/0025* (2013.01)

(58) Field of Classification Search
CPC .. G02B 13/0045; G02B 9/62; G02B 27/0025; G02B 13/18; G02B 27/0012
See application file for complete search history.

(56) References Cited

U.S. PATENT DOCUMENTS

| 10,203,477 B2 | 2/2019 | Dai |
| 2016/0131899 A1* | 5/2016 | Jo .......................... H04N 25/74 |
| | | 359/713 |
| 2019/0243106 A1 | 8/2019 | Xu et al. |
| 2020/0409074 A1* | 12/2020 | Oinuma ............. G02B 13/0045 |
| 2022/0155560 A1* | 5/2022 | Wang ................ G02B 13/0045 |

FOREIGN PATENT DOCUMENTS

CN     105676419 B  *  2/2020  ......... G02B 13/0045

OTHER PUBLICATIONS

First Examination Report for Application No. 202114004722 dated Jan. 10, 2022, 6 pages.

* cited by examiner

*Primary Examiner* — George G. King
*Assistant Examiner* — Anna Smith
(74) *Attorney, Agent, or Firm* — Barnes & Thornburg LLP

(57) ABSTRACT

The present disclosure discloses a camera lens assembly including, sequentially from an object side to an image side along an optical axis, a first lens having refractive power; a second lens having positive refractive power and a convex image-side surface; a third lens having negative refractive power, a convex object-side surface and a concave image-side surface; a fourth lens having negative refractive power; a fifth lens having refractive power and a convex image-side surface; and a sixth lens having refractive power, a convex object-side surface and a concave image-side surface. Half of a maximum field-of-view Semi-FOV of the camera lens assembly and a combined focal length f23 of the second lens and the third lens satisfy: 4.00 mm<tan²(Semi-FOV)*f23<10.00 mm.

18 Claims, 12 Drawing Sheets

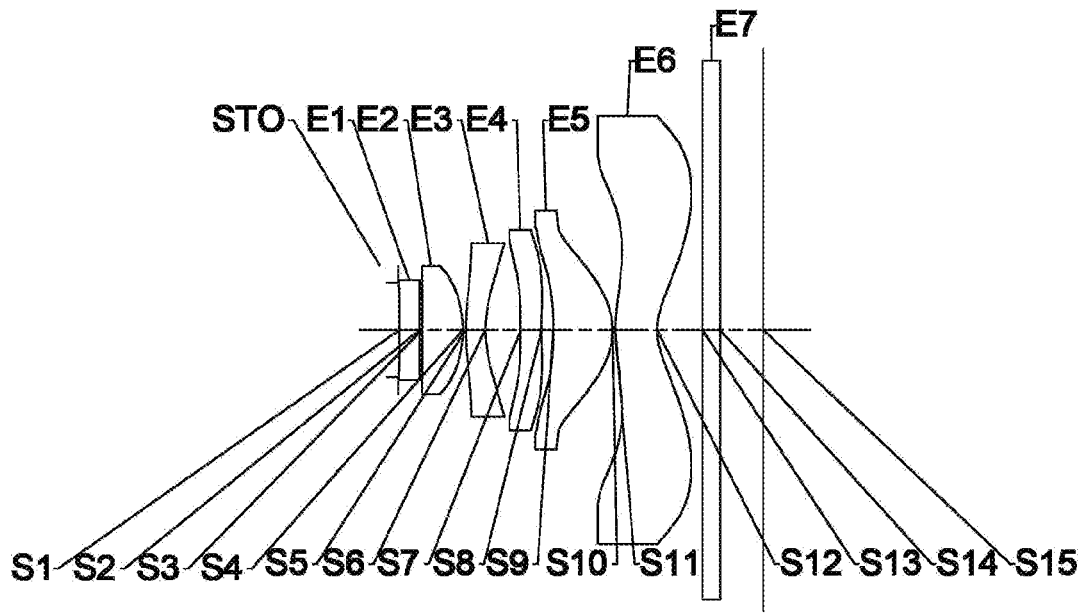
Fig. 1
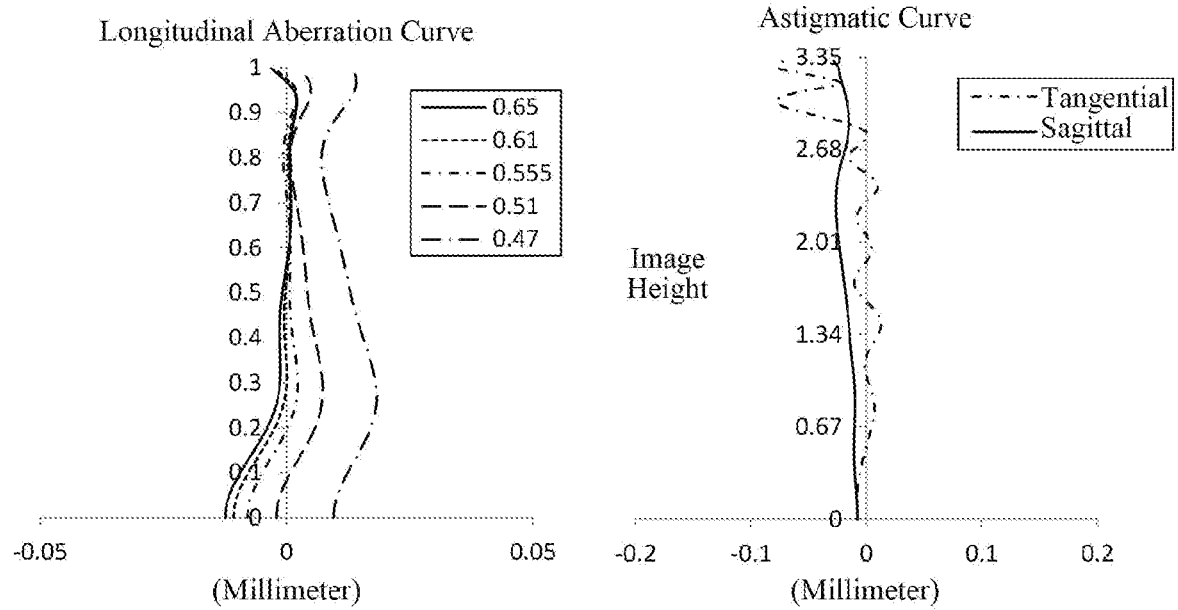
Fig. 2A                               Fig. 2B

CAMERA LENS ASSEMBLY

CROSS-REFERENCE TO RELATED APPLICATION

This application claims benefit of priority to Chinese Patent Application No. 202010169586.X filed on Mar. 12, 2020 before the China National Intellectual Property Administration, the entire disclosure of which is incorporated herein by reference in its entity.

TECHNICAL FIELD

The present disclosure relates to the field of optical elements, and specifically, relates to a camera lens assembly.

BACKGROUND

With the rapid development of science and technology, camera lens assemblies suitable for portable electronic products are changing rapidly. On the one hand, users have higher and higher requirements for the image quality of the camera lens assembly. On the other hand, as the portable electronic products are gradually developing towards miniaturization, users have increasingly strict requirements on the total length and the size of the front end of the camera lens assembly. This will reduce the design freedom of the camera lens assembly and increase the design difficulty.

In addition, with the improvement of the performance and size reduction of CCD and CMOS image sensors, higher requirements have been placed on the corresponding camera lens assemblies. In order to meet adapt the camera lens assemblies to market demand, lens assembly manufacturers urgently need to design a camera lens assembly with high image quality.

SUMMARY

In one aspect, the present disclosure provides a camera lens assembly which includes, sequentially from an object side to an image side along an optical axis, a first lens having refractive power; a second lens having positive refractive power, and an image-side surface thereof is convex; a third lens having negative refractive power, an object-side surface thereof is convex, and an image-side surface thereof is concave; a fourth lens having negative refractive power; a fifth lens having refractive power, and an image-side surface thereof is convex; and a sixth lens having refractive power, an object-side surface thereof is convex, and an image-side surface thereof is concave. Half of a maximum field-of-view Semi-FOV of the camera lens assembly and a combined focal length f23 of the second lens and the third lens may satisfy: $4.00\ mm < \tan^2(\text{Semi-FOV}) \cdot f23 < 10.00\ mm$.

In one embodiment, at least one of an object-side surface of the first lens to the image-side surface of the sixth lens is aspheric.

In one embodiment, the camera lens assembly may further include a stop, and the stop may be disposed between the object side and the first lens.

In one embodiment, a distance TTL along the optical axis from an object-side surface of the first lens to an imaging plane of the camera lens assembly and half of a diagonal length ImgH of an effective pixel area on the imaging plane of the camera lens assembly may satisfy: $TTL/ImgH < 1.36$.

In one embodiment, a total effective focal length f of the camera lens assembly and a radius of curvature R12 of the image-side surface of the sixth lens may satisfy: $3.00 < f/R12 < 6.00$.

In one embodiment, a radius of curvature R5 of the object-side surface of the third lens and a radius of curvature R6 of the image-side surface of the third lens may satisfy: $2.00 < (R5+R6)/(R5-R6) < 6.00$.

In one embodiment, a center thickness CT4 of the fourth lens along the optical axis and a spaced interval T45 between the fourth lens and the fifth lens along the optical axis may satisfy: $1.00 < CT4/T45 < 4.00$.

In one embodiment, a distance TD along the optical axis from an object-side surface of the first lens to the image-side surface of the sixth lens and a sum of spaced intervals $\Sigma AT$ along the optical axis between each two adjacent lenses of the first lens to the sixth lens may satisfy: $\Sigma AT/TD < 0.23$.

In one embodiment, SAG51, being a distance along the optical axis from an intersection of an object-side surface of the fifth lens and the optical axis to a vertex of an effective radius of the object-side surface of the fifth lens, and SAG52, being a distance along the optical axis from an intersection of the image-side surface of the fifth lens and the optical axis to a vertex of an effective radius of the image-side surface of the fifth lens, may satisfy: $-3.00 < (SAG51+SAG52)/(SAG51-SAG52) < -1.00$ In one embodiment, a maximum effective radius DT62 of the image-side surface of the sixth lens and a maximum effective radius DT11 of an object-side surface of the first lens may satisfy: $4.00 < DT62/DT11 < 5.00$.

In one embodiment, an edge thickness ET6 of the sixth lens and an edge thickness ET3 of the third lens may satisfy: $1.00 < ET6/ET3 < 3.00$.

In one embodiment, a combined focal length f123 of the first lens, the second lens, and the third lens and a combined focal length f234 of the second lens, the third lens and the fourth lens may satisfy: $1.00 < f234/f123 < 5.00$.

In another aspect, the present disclosure provides a camera lens assembly which includes, sequentially from an object side to an image side along an optical axis, a first lens having refractive power; a second lens having positive refractive power, and an image-side surface thereof is convex; a third lens having negative refractive power, an object-side surface thereof is convex, and an image-side surface thereof is concave; a fourth lens having negative refractive power; a fifth lens having refractive power, and an image-side surface thereof is convex; and a sixth lens having refractive power, an object-side surface thereof is convex, and an image-side surface thereof is concave. A distance TTL along the optical axis from an object-side surface of the first lens to an imaging plane of the camera lens assembly and half of a diagonal length ImgH of an effective pixel area on the imaging plane of the camera lens assembly may satisfy: $TTL/ImgH < 1.36$.

The present disclosure employs a plurality of lenses (for example, six lenses), and the above camera lens group has at least one beneficial effect, such as ultra-small front end and good image quality and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent by reading the detailed description of the non-limiting embodiments with reference to the accompanying drawings:

FIG. 1 illustrates a schematic structural view of a camera lens assembly according to example 1 of the present disclosure;

FIGS. 2A to 2D illustrate a longitudinal aberration curve, an astigmatic curve, a distortion curve, and a lateral color curve of the camera lens assembly of the example 1, respectively;

DETAILED DESCRIPTION OF EMBODIMENTS

Figure 2C:
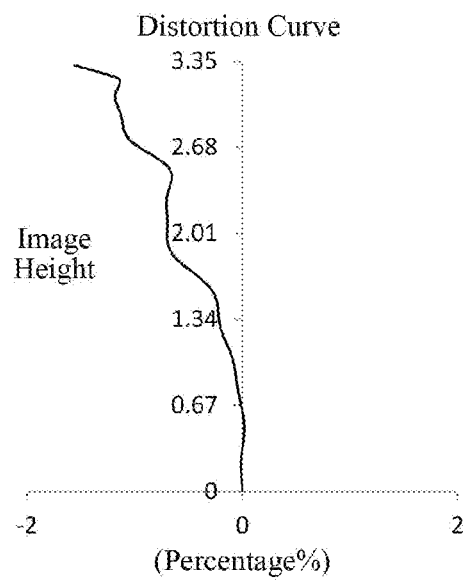

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

A camera lens assembly according to an exemplary embodiment of the present disclosure may include six lenses having refractive power, which are a first lens, a second lens, a third lens, a fourth lens, a fifth lens and a sixth lens. The six lenses are arranged sequentially from an object side to an image side along an optical axis. Among the first lens to the sixth lens, there may be a spaced interval between each two adjacent lenses.

In an exemplary embodiment, the first lens may have positive or negative refractive power; the second lens may have positive refractive power, and an image-side surface thereof may be convex; the third lens may have negative refractive power, an object-side surface thereof may be convex, and an image-side surface thereof may be concave; the fourth lens may have negative refractive power; the fifth lens may have positive or negative refractive power, and an image-side surface thereof may be convex; and the sixth lens may have positive or negative refractive power, an object-side surface thereof may be convex, and an image-side surface thereof may be concave.

By reasonably assigning the refractive power of each lens of the camera lens assembly, the low-order aberration of the camera lens assembly may be effectively compensated, which is beneficial to reduce tolerance sensitivity.

In an exemplary embodiment, the camera lens assembly according to the present disclosure may satisfy: 4.00 mm<$\tan^2$(Semi-FOV)*f23<10.00 mm, where Semi-FOV is half of a maximum field-of-view of the camera lens assembly, and f23 is a combined focal length of the second lens and the third lens. More specifically, Semi-FOV and f23 may further satisfy: 4.80 mm<$\tan^2$(Semi-FOV)*f23<9.50 mm. When 4.00 mm<$\tan^2$(Semi-FOV)*f23<10.00 mm is satisfied, the imaging effect of the camera lens assembly with the large field-of-view may be achieved, which is beneficial to emphasize the foreground and highlighting the contrast between far and near, thereby increasing the spatial depth of the shooting picture.

In an exemplary embodiment, the camera lens assembly according to the present disclosure may satisfy: TTL/ImgH<1.36, where TTL is a distance along the optical axis from an object-side surface of the first lens to an imaging plane of the camera lens assembly, and ImgH is half of a diagonal length of an effective pixel area on the imaging plane of the camera lens assembly. Satisfying TTL/ImgH<1.36 may achieve the ultra-thin characteristics of the camera lens assembly.

In an exemplary embodiment, the camera lens assembly according to the present disclosure may satisfy: 3.00<f/R12<6.00, where f is a total effective focal length of the camera lens assembly, and R12 is a radius of curvature of the image-side surface of the sixth lens. More specifically, f and R12 may further satisfy: 3.10<f/R12<5.50. When 3.00<f/R12<6.00 is satisfied, the contribution of the sixth lens to the fifth-order spherical aberration of the camera lens assembly may be well controlled, and then the third-order spherical aberration generated by the lens system may be compensated, so that the camera lens assembly has a good image quality in the on-axis area.

In an exemplary embodiment, the camera lens assembly according to the present disclosure may satisfy: 2.00<(R5+R6)/(R5−R6)<6.00, where R5 is a radius of curvature of the object-side surface of the third lens, and R6 is a radius of curvature of the image-side surface of the third lens. More specifically, R5 and R6 may further satisfy: 2.10<(R5+R6)/(R5−R6)<5.40. When 2.00<(R5+R6)/(R5−R6)<6.00 is satisfied, the deflection angle of the edge light of the camera lens assembly may be reasonably controlled, and the sensitivity of the camera lens assembly may be effectively reduced.

In an exemplary embodiment, the camera lens assembly according to the present disclosure may satisfy: 1.00<CT4/T45<4.00, where CT4 is a center thickness of the fourth lens along the optical axis, and T45 is a spaced interval between the fourth lens and the fifth lens along the optical axis. Satisfying 1.00<CT4/T45<4.00 may effectively reduce the risk of ghost images between the fourth lens and the fifth lens. Also, it is beneficial to reduce the total length of the camera lens assembly.

In an exemplary embodiment, the camera lens assembly according to the present disclosure may satisfy: ΣAT/TD<0.23, where TD is a distance along the optical axis from an object-side surface of the first lens to the image-side surface of the sixth lens, and ΣAT is a sum of spaced intervals along the optical axis between each two adjacent lenses of the first lens to the sixth lens. Satisfying ΣAT/TD<0.23 may ensure the processing and assembly characteristics of the camera lens assembly, and avoid problems, such as the interference between the front and rear lenses in the assembly process, caused by the small gap. At the same time, it is beneficial to reduce light deflection, adjust the field curvature of the camera lens assembly, reduce the sensitivity, and obtain better image quality.

In an exemplary embodiment, the camera lens assembly according to the present disclosure may satisfy: −3.00<(SAG51+SAG52)/(SAG51−SAG52)<−1.00, where SAG51 is a distance along the optical axis from an intersection of an object-side surface of the fifth lens and the optical axis to a vertex of an effective radius of the object-side surface of the fifth lens, and SAG52 is a distance along the optical axis from an intersection of the image-side surface of the fifth lens and the optical axis to a vertex of an effective radius of the image-side surface of the fifth lens. More specifically, SAG51 and SAG52 may further satisfy: −2.80<(SAG51+SAG52)/(SAG51−SAG52)<−1.20. When −3.00<(SAG51+SAG52)/(SAG51−SAG52)<−1.00 is satisfied, the shape of the fifth lens may be effectively controlled, so as to ensure the formability and workability of the fifth lens. Also, it is beneficial to avoid difficulties in forming stress and coating caused by the excessive thickness of the fourth lens.

In an exemplary embodiment, the camera lens assembly according to the present disclosure may satisfy: 4.00<DT62/DT11<5.00, where DT62 is a maximum effective radius of the image-side surface of the sixth lens, and DT11 is a maximum effective radius of an object-side surface of the first lens. More specifically, DT62 and DT11 may further satisfy: 4.30<DT62/DT11<4.80. On the one hand, satisfying 4.00<DT62/DT11<5.00 is beneficial to reducing the size of the front end of the camera lens assembly, making the entire camera lens assembly lighter and thinner, thereby achieving the characteristics of a small front end. On the other hand, it is beneficial to reasonably limit the range of incident light, eliminate light with poor edge quality, reduce the off-axis aberration, and effectively improve the resolution of the camera lens assembly.

In an exemplary embodiment, the camera lens assembly according to the present disclosure may satisfy: 1.00<ET6/ET3<3.00, where ET6 is an edge thickness of the sixth lens, and ET3 is an edge thickness of the third lens. More specifically, ET6 and ET3 may further satisfy: 1.40<ET6/ET3<2.60. When 1.00<ET6/ET3<3.00 is satisfied, the field curvature contributed by the image-side surface of the third lens may be controlled within a reasonable range to compensate the field curvature generated by the rear lenses.

In an exemplary embodiment, the camera lens assembly according to the present disclosure may satisfy: 1.00<f234/f123<5.00, where f123 is a combined focal length of the first lens, the second lens, and the third lens, and f234 is a combined focal length of the second lens, the third lens and the fourth lens. More specifically, f234 and f123 may further satisfy: 1.30<f234/f123<4.90. When 1.00<f234/f123<5.00 is satisfied, the aberration of the entire camera lens assembly may be controlled. The aberrations generated by the front and rear lenses are compensated for each other, so that the aberration of the camera lens assembly is at a reasonable level.

In an exemplary embodiment, the camera lens assembly according to the present disclosure further includes a stop disposed between the object side and the first lens. Configuring the stop close to the front end may achieve the characteristics of the small front end of the camera lens assembly. Optionally, the above camera lens assembly may further include an optical filter for correcting the color deviation and/or a protective glass for protecting the photosensitive element located on an imaging plane. The present disclosure proposes a camera lens assembly with characteristics, such as ultra-small front end, ultra-thin, large imaging plane, and high image quality. The camera lens assembly according to the above embodiments of the present disclosure may employ a plurality of lenses, such as six lenses as described above. By properly configuring the refractive power of each lens, the surface shape, the center thickness of each lens, and spaced intervals along the optical axis between the lenses, the incident light may be effectively converged, the total optical length of the imaging lens assembly may be reduced, and the workability of the imaging lens assembly may be improved, such that the camera lens assembly is more advantageous for production processing.

In the embodiments of the present disclosure, at least one of the surfaces of lenses is aspheric, that is, at least one of the object-side surface of the first lens to the image-side surface of the sixth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens and the sixth lens is aspheric. Optionally, the object-side surface and the image-side surface of each of the first lens, the second lens, the third lens, the fourth lens, the fifth lens and the sixth lens are aspheric.

However, it will be understood by those skilled in the art that the number of lenses constituting the camera lens assembly may be varied to achieve the various results and advantages described in this specification without departing from the technical solution claimed by the present disclosure. For example, although the embodiment is described by taking six lenses as an example, the camera lens assembly is not limited to include six lenses. The camera lens assembly may also include other numbers of lenses if desired.

Some specific examples of a camera lens assembly applicable to the above embodiment will be further described below with reference to the accompanying drawings.

Example 1

A camera lens assembly according to example 1 of the present disclosure is described below with reference to FIG. 1 to FIG. 2D. FIG. 1 shows a schematic structural view of the camera lens assembly according to example 1 of the present disclosure.

As shown in FIG. 1, the camera lens assembly includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

The first lens E1 has negative refractive power, an object-side surface S1 thereof is convex, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is convex, and an image-side surface S6 thereof is concave. The fourth lens E4 has negative refractive power, an object-side surface S7 thereof is concave, and an image-side surface S8 thereof is concave. The fifth lens E5 has positive refractive power, an object-side surface S9 thereof is concave, and an image-side surface S10 thereof is convex. The sixth lens E6 has negative refractive power, an object-side surface S11 thereof is convex, and an image-side surface S12 thereof is concave. The optical filter E7 has an object-side surface S13 and an image-side surface S14. Light from an object sequentially passes through the respective surfaces S1 to S14 and is finally imaged on the imaging plane S15.

Table 1 is a table illustrating basic parameters of the camera lens assembly of example 1, wherein the units for the radius of curvature, the thickness/distance and the focal length are millimeter (mm).

TABLE 1

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | 0.0120 | | | | |
| S1 | Aspheric | 15.5178 | 0.2409 | 1.62 | 23.5 | −25.45 | −99.0000 |
| S2 | Aspheric | 7.9261 | 0.0300 | | | | 3.0783 |
| S3 | Aspheric | 7.6774 | 0.4896 | 1.55 | 56.1 | 2.08 | 45.8166 |
| S4 | Aspheric | −1.2998 | 0.0300 | | | | 0.0093 |
| S5 | Aspheric | 2.4018 | 0.2350 | 1.67 | 20.4 | −4.71 | 0.9351 |
| S6 | Aspheric | 1.3070 | 0.4237 | | | | −0.0022 |
| S7 | Aspheric | −49.3392 | 0.2500 | 1.62 | 23.5 | −4.61 | −91.1327 |
| S8 | Aspheric | 3.1661 | 0.1432 | | | | −1.4146 |
| S9 | Aspheric | −6.6517 | 0.7074 | 1.55 | 56.1 | 1.74 | −2.3822 |
| S10 | Aspheric | −0.8605 | 0.0300 | | | | −1.0000 |
| S11 | Aspheric | 1.6477 | 0.4987 | 1.54 | 55.9 | −2.77 | −1.0246 |
| S12 | Aspheric | 0.6984 | 0.5466 | | | | −1.0000 |
| S13 | Spherical | Infinite | 0.2100 | 1.52 | 64.2 | | |

TABLE 1-continued

| Surface number | Surface type | Radius of curvature | Thickness/ Distance | Material Refractive index | Material Abbe number | Focal length | Conic coefficient |
|---|---|---|---|---|---|---|---|
| S14 | Spherical | Infinite | 0.5154 | | | | |
| S15 | Spherical | Infinite | | | | | |

In this example, a total effective focal length f of the camera lens assembly is 2.72 mm, a total length TTL of the camera lens assembly (that is, a distance along the optical axis from the object-side surface S1 of the first lens E1 to the imaging plane S15 of the camera lens assembly) is 4.35 mm, half of a diagonal length ImgH of an effective pixel area on the imaging plane S15 of the camera lens assembly is 3.32 mm, half of a maximum field-of-view Semi-FOV of the camera lens assembly is 50.9°, and an aperture value Fno of the camera lens assembly is 2.42.

In example 1, the object-side surface and the image-side surface of any one of the first lens E1 to the sixth lens E6 are aspheric. The surface shape x of each aspheric lens may be defined by using, but not limited to, the following aspheric formula:

$$x = \frac{ch^2}{1 + \sqrt{1 - (k+1)c^2h^2}} + \sum A_i h^i \qquad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S12 in example 1.

TABLE 2

| Surface number | A4 | A6 | A8 |
|---|---|---|---|
| S1 | −1.8923E−01 | 3.1067E−01 | −4.6074E+00 |
| S2 | −3.1598E−01 | 4.1345E−01 | −2.6978E+00 |
| S3 | −3.0030E−01 | 1.0335E+00 | −1.7425E+01 |
| S4 | 4.3642E−02 | −5.1742E−01 | 4.3886E+00 |
| S5 | −3.1771E−01 | 6.7570E−01 | −2.7851E+00 |
| S6 | −4.4976E−01 | 8.8341E−01 | −2.3658E+00 |
| S7 | −5.5382E−01 | 1.8025E+00 | −3.2973E+00 |
| S8 | −9.6566E−01 | 2.7588E+00 | −4.9938E+00 |
| S9 | −4.4094E−01 | −2.9928E−01 | 7.1093E+00 |
| S10 | −1.7070E−01 | 1.2043E+00 | −4.2084E+00 |
| S11 | −7.1414E−01 | 1.5976E+00 | −2.7675E+00 |
| S12 | −1.1156E+00 | 1.9123E+00 | −2.7038E+00 |

| Surface number | A10 | A12 | A14 |
|---|---|---|---|
| S1 | 4.9599E+01 | −3.4852E+02 | 1.5662E+03 |
| S2 | 2.2664E+01 | −7.7938E+01 | 5.6142E+01 |
| S3 | 1.6658E+02 | −9.4388E+02 | 3.3300E+03 |
| S4 | −3.3632E+01 | 1.5189E+02 | −4.1294E+02 |
| S5 | 8.2470E+00 | −1.5576E+01 | 1.9164E+01 |
| S6 | 4.1115E+00 | −1.9523E+00 | −9.8140E+00 |
| S7 | −2.8597E+00 | 3.1356E+01 | −7.8188E+01 |
| S8 | 5.7629E+00 | −6.6775E+00 | 1.1270E+01 |
| S9 | −2.4864E+01 | 5.1025E+01 | −7.8752E+01 |
| S10 | 1.1630E+01 | −2.6027E+01 | 4.7557E+01 |
| S11 | 3.4497E+00 | −3.2118E+00 | 2.2926E+00 |
| S12 | 2.8425E+00 | −2.1865E+00 | 1.2333E+00 |

| Surface number | A16 | A18 | A20 |
|---|---|---|---|
| S1 | −4.2931E+03 | 6.5091E+03 | −4.1783E+03 |
| S2 | 5.4173E+02 | −1.7322E+03 | 1.5912E+03 |
| S3 | −7.0573E+03 | 8.1800E+03 | −3.9775E+03 |
| S4 | 6.7078E+02 | −6.0231E+02 | 2.2951E+02 |
| S5 | −1.4966E+01 | 6.6970E+00 | −1.2899E+00 |
| S6 | 2.8351E+01 | −3.8418E+01 | 2.9743E+01 |
| S7 | 1.0434E+02 | −8.0896E+01 | 3.4423E+01 |
| S8 | −1.6308E+01 | 1.4966E+01 | −8.1905E+00 |
| S9 | 9.9363E+01 | −9.7890E+01 | 6.8807E+01 |
| S10 | −6.9297E+01 | 7.7028E+01 | −6.2693E+01 |
| S11 | −1.2667E+00 | 5.4095E−01 | −1.7671E−01 |
| S12 | −5.1247E−01 | 1.5708E−01 | −3.5343E−02 |

Figure 2D:
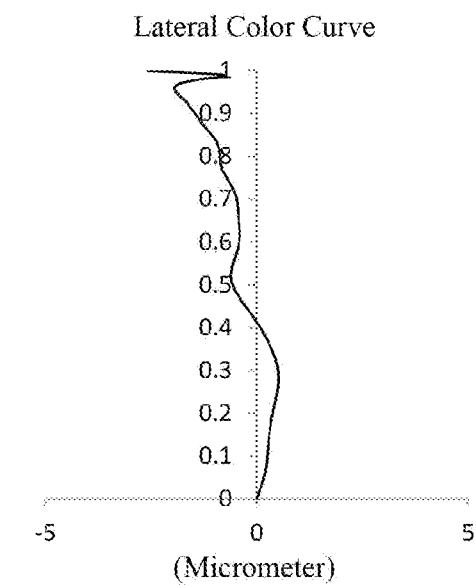

FIG. 2A illustrates a longitudinal aberration curve of the camera lens assembly according to example 1, representing deviations of focal points converged by light of different wavelengths after passing through the lens assembly. FIG. 2B illustrates an astigmatic curve of the camera lens assembly according to example 1, representing a curvature of a tangential plane and a curvature of a sagittal plane. FIG. 2C illustrates a distortion curve of the camera lens assembly according to example 1, representing amounts of distortion corresponding to different image heights. FIG. 2D illustrates a lateral color curve of the camera lens assembly according to example 1, representing deviations of different image heights on an imaging plane after light passes through the lens assembly. It can be seen from FIG. 2A to FIG. 2D that the camera lens assembly provided in example 1 may achieve good image quality.

Example 2

Figure 3:
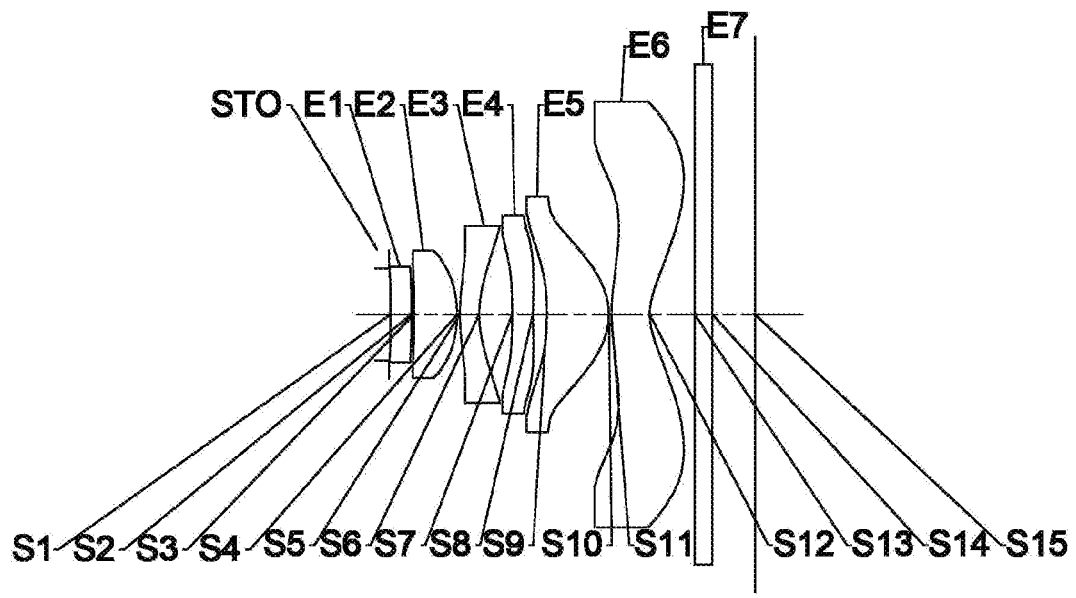
FIG. 3 illustrates a schematic structural view of a camera lens assembly according to example 2 of the present disclosure.

A camera lens assembly according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the camera lens assembly according to example 2 of the present disclosure.

As shown in FIG. 3, the camera lens assembly includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

The first lens E1 has negative refractive power, an object-side surface S1 thereof is convex, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is convex, and an image-side surface S6 thereof is concave. The fourth lens E4 has negative refractive power, an object-side surface S7 thereof is concave, and an image-side surface S8 thereof is concave. The fifth lens E5 has positive refractive power, an object-side surface S9 thereof is concave, and an image-side surface S10 thereof is convex. The sixth lens E6 has negative refractive power, an object-side surface S11 thereof is convex, and an image-side surface S12 thereof is concave. The optical filter E7 has an object-side surface S13 and an image-side surface S14. Light from an object sequentially passes through the respective surfaces S1 to S14 and is finally imaged on the imaging plane S15.

In this example, a total effective focal length f of the camera lens assembly is 2.71 mm, a total length TTL of the camera lens assembly is 4.40 mm, half of a diagonal length ImgH of an effective pixel area on the imaging plane S15 of the camera lens assembly is 3.32 mm, half of a maximum field-of-view Semi-FOV of the camera lens assembly is 51.2°, and an aperture value Fno of the camera lens assembly is 2.46.

Table 3 is a table illustrating basic parameters of the camera lens assembly of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

Figure 4A:
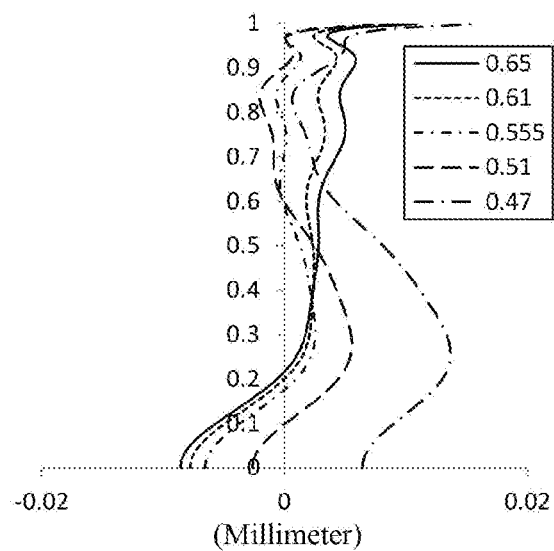
FIGS. 4A to 4D illustrate a longitudinal aberration curve, an astigmatic curve, a distortion curve, and a lateral color curve of the camera lens assembly of the example 2, respectively.
Figure 4B:
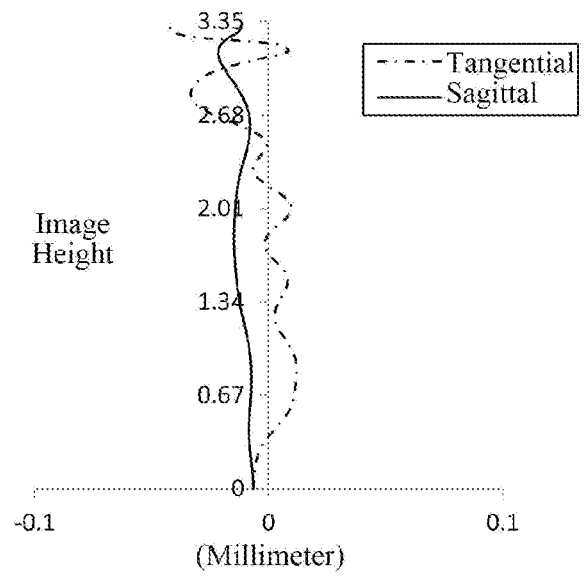
Figure 4C:
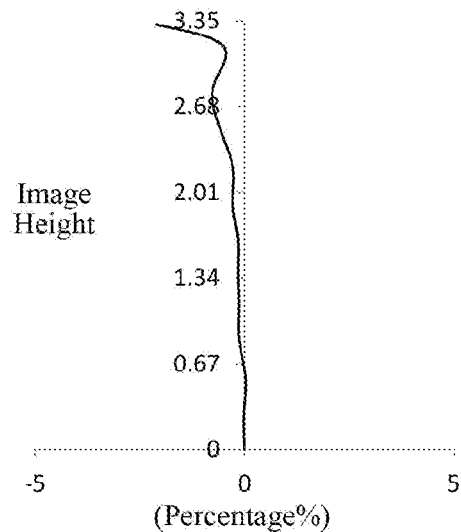
Figure 4D:
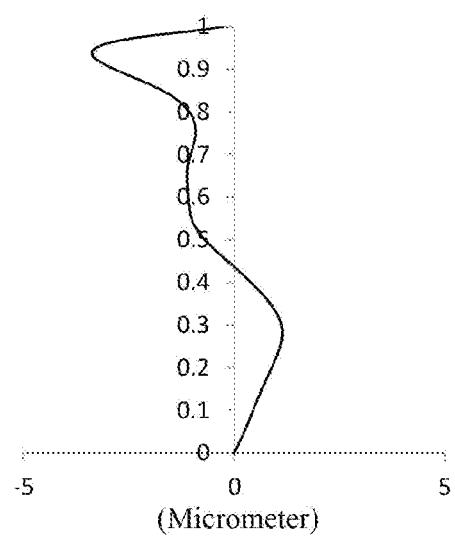

FIG. 4A illustrates a longitudinal aberration curve of the camera lens assembly according to example 2, representing deviations of focal points converged by light of different wavelengths after passing through the lens assembly. FIG. 4B illustrates an astigmatic curve of the camera lens assembly according to example 2, representing a curvature of a tangential plane and a curvature of a sagittal plane. FIG. 4C illustrates a distortion curve of the camera lens assembly according to example 2, representing amounts of distortion corresponding to different image heights. FIG. 4D illustrates a lateral color curve of the camera lens assembly according to example 2, representing deviations of different image heights on an imaging plane after light passes through the lens assembly. It can be seen from FIG. 4A to FIG. 4D that the camera lens assembly provided in example 2 may achieve good image quality.

Example 3

Figure 5:
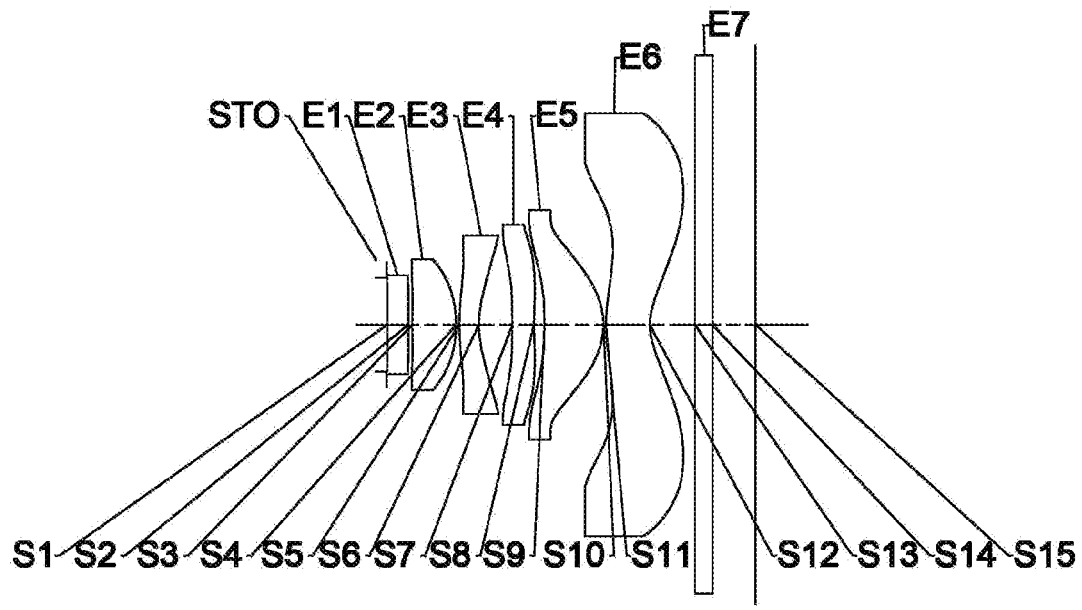
FIG. 5 illustrates a schematic structural view of a camera lens assembly according to example 3 of the present disclosure.

A camera lens assembly according to example 3 of the present disclosure is described below with reference to FIG. 5 to FIG. 6D. FIG. 5 shows a schematic structural view of the camera lens assembly according to example 3 of the present disclosure.

As shown in FIG. 5, the camera lens assembly includes a stop STO, a first lens E1, a second lens E2, a third lens E3, a fourth lens E4, a fifth lens E5, a sixth lens E6, an optical

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | 0.0171 | | | | |
| S1 | Aspheric | 54.0617 | 0.2499 | 1.62 | 23.5 | −62.51 | 99.0000 |
| S2 | Aspheric | 23.0438 | 0.0327 | | | | 60.6048 |
| S3 | Aspheric | 12.1608 | 0.5223 | 1.55 | 56.1 | 2.15 | 7.2533 |
| S4 | Aspheric | −1.2787 | 0.0300 | | | | 0.0446 |
| S5 | Aspheric | 2.2192 | 0.2350 | 1.67 | 20.4 | −4.97 | 0.1272 |
| S6 | Aspheric | 1.2720 | 0.3982 | | | | −0.0141 |
| S7 | Aspheric | −50.9964 | 0.2500 | 1.62 | 23.5 | −4.37 | 99.0000 |
| S8 | Aspheric | 2.9870 | 0.1698 | | | | 0.7091 |
| S9 | Aspheric | −6.7753 | 0.7469 | 1.55 | 56.1 | 1.67 | 0.0000 |
| S10 | Aspheric | −0.8329 | 0.0304 | | | | −1.0000 |
| S11 | Aspheric | 1.7573 | 0.4613 | 1.54 | 55.9 | −2.63 | −1.0000 |
| S12 | Aspheric | 0.7103 | 0.5452 | | | | −0.9984 |
| S13 | Spherical | Infinite | 0.2100 | 1.52 | 64.2 | | |
| S14 | Spherical | Infinite | 0.5182 | | | | |
| S15 | Spherical | Infinite | | | | | |

TABLE 4

| Surface number | A4 | A6 | A8 | A10 | A12 | A14 | A16 | A18 | A20 |
|---|---|---|---|---|---|---|---|---|---|
| S1 | −1.8303E−01 | 4.6206E−01 | −1.2545E+01 | 1.9192E+02 | −1.6926E+03 | 8.9557E+03 | −2.8027E+04 | 4.7811E+04 | −3.4258E+04 |
| S2 | −3.3053E−01 | −5.5750E−02 | 9.4384E+00 | −1.1894E+02 | 8.9151E+02 | −3.9672E+03 | 1.0465E+04 | −1.5091E+04 | 9.1548E+03 |
| S3 | −3.1486E−01 | 4.8422E−01 | −6.9088E+00 | 6.9273E+01 | −4.0485E+02 | 1.5053E+03 | −3.4153E+03 | 4.3084E+03 | −2.3181E+03 |
| S4 | 2.8107E−02 | −7.4412E−01 | 6.8700E+00 | −4.4819E+01 | 1.7541E+02 | 4.2262E+02 | 6.1705E+02 | −5.0316E+02 | 1.7583E+02 |
| S5 | −3.0828E−01 | 4.5759E−01 | −9.7099E−01 | 1.2356E−01 | 5.8160E+00 | −1.5834E+01 | 2.0015E+01 | −1.2911E+01 | 3.4402E+00 |
| S6 | −4.1942E−01 | 6.5164E−01 | −1.4245E+00 | 2.1182E+00 | −1.7719E+00 | 4.2255E−01 | 4.9584E−01 | −4.0249E−01 | 8.3150E−02 |
| S7 | −6.2650E−01 | 2.8156E+00 | −9.7192E+00 | 1.9986E+01 | −2.1403E+01 | 4.2793E+00 | 1.7396E+01 | −2.1450E+01 | 1.0650E+01 |
| S8 | −1.1801E+00 | 4.3807E+00 | −1.0995E+01 | 1.7810E+01 | −1.9096E+01 | 1.3429E+01 | −5.9027E+00 | 1.4593E+00 | −1.5322E−01 |
| S9 | −7.1104E−01 | 2.8975E−01 | 8.5461E+00 | −3.5838E+01 | 7.7245E+01 | −1.0626E+02 | 9.8615E+01 | −6.1627E+01 | 2.4824E+01 |
| S10 | −2.2715E−01 | 1.3424E+00 | −4.1213E+00 | 9.5193E+00 | −1.6274E+01 | 2.0378E+01 | −1.8792E+01 | 1.2749E+01 | −6.1705E+00 |
| S11 | −7.3102E−01 | 1.7940E+00 | −3.0668E+00 | 3.5331E+00 | −2.8507E+00 | 1.6418E+00 | −6.7650E−01 | 1.9712E−01 | −3.9505E−02 |
| S12 | −1.0851E+00 | 1.7675E+00 | −2.2750E+00 | 2.1331E+00 | −1.4533E+00 | 7.2521E−01 | −2.6683E−01 | 7.2516E−02 | −1.4483E−02 | filter E7 and an imaging plane S15, which are sequentially arranged from an object side to an image side.

The first lens E1 has negative refractive power, an object-side surface S1 thereof is convex, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is convex, and an image-side surface S6 thereof is concave. The fourth lens E4 has negative refractive power, an object-side surface S7 thereof is convex, and an image-side surface S8 thereof is concave. The fifth lens E5 has positive refractive power, an object-side surface S9 thereof is concave, and an image-side surface S10 thereof is convex. The sixth lens E6 has negative refractive power, an object-side surface S11 thereof is convex, and an image-side surface S12 thereof is concave. The optical filter E7 has an object-side surface S13 and an image-side surface S14.

Light from an object sequentially passes through the respective surfaces S1 to S14 and is finally imaged on the imaging plane S15.

In this example, a total effective focal length f of the camera lens assembly is 2.72 mm, a total length TTL of the camera lens assembly is 4.39 mm, half of a diagonal length ImgH of an effective pixel area on the imaging plane S15 of the camera lens assembly is 3.35 mm, half of a maximum field-of-view Semi-FOV of the camera lens assembly is 51.3°, and an aperture value Fno of the camera lens assembly is 2.42.

Table 5 is a table illustrating basic parameters of the camera lens assembly of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | 0.0087 | | | | |
| S1 | Aspheric | 13.6750 | 0.2501 | 1.62 | 23.5 | −100.03 | −25.8719 |
| S2 | Aspheric | 11.2014 | 0.0483 | | | | 7.9644 |
| S3 | Aspheric | 9.5099 | 0.5229 | 1.55 | 56.1 | 2.16 | 99.0000 |
| S4 | Aspheric | −1.3180 | 0.0350 | | | | −0.0302 |
| S5 | Aspheric | 2.5347 | 0.2350 | 1.67 | 20.4 | −4.45 | 0.8503 |
| S6 | Aspheric | 1.3160 | 0.3982 | | | | −0.0065 |
| S7 | Aspheric | 148.1923 | 0.2559 | 1.62 | 23.5 | −4.34 | 99.0000 |
| S8 | Aspheric | 2.7450 | 0.1272 | | | | −0.0177 |
| S9 | Aspheric | −8.4635 | 0.7020 | 1.55 | 56.1 | 1.81 | −8.9110 |
| S10 | Aspheric | −0.9092 | 0.0300 | | | | −1.0064 |
| S11 | Aspheric | 1.6120 | 0.5230 | 1.54 | 55.9 | −3.12 | −0.9912 |
| S12 | Aspheric | 0.7287 | 0.5383 | | | | −1.0004 |
| S13 | Spherical | Infinite | 0.2100 | 1.52 | 64.2 | | |
| S14 | Spherical | Infinite | 0.5121 | | | | |
| S15 | Spherical | Infinite | | | | | |

TABLE 6

| Surface number | A4 | A6 | A8 | A10 | A12 | A14 | A16 | A18 | A20 |
|---|---|---|---|---|---|---|---|---|---|
| S1 | −1.9368E−01 | 9.1178E−01 | −1.5991E+01 | 1.7610E+02 | −1.1932E+03 | 5.0136E+03 | −1.2690E+04 | 1.7701E+04 | −1.0442E+04 |
| S2 | −2.9585E−01 | −2.6060E−01 | 1.2135E+01 | −1.4055E+02 | 9.8752E+02 | −4.2361E+03 | 1.0939E+04 | −1.5572E+04 | 9.3568E+03 |
| S3 | −2.7333E−01 | −2.8938E−01 | 5.5013E+00 | −4.7069E+01 | 2.6612E+02 | −9.4518E+02 | 2.0940E+03 | −2.6356E+03 | 1.4254E+03 |
| S4 | 9.1626E−02 | −1.4687E+00 | 1.1927E+01 | −6.6307E+01 | 2.3687E+02 | −5.4135E+02 | 7.6677E+02 | −6.1337E+02 | 2.1149E+02 |
| S5 | −2.8270E−01 | 1.3997E−01 | 5.4835E−01 | −3.5238E+00 | 9.7838E+00 | −1.5124E+01 | 1.3627E+01 | −6.8346E+00 | 1.4996E+00 |
| S6 | −4.4604E−01 | 9.2639E−01 | −3.2802E+00 | 9.9594E+00 | −2.2440E+01 | 3.5218E+01 | −3.6947E+01 | 2.4534E+01 | −9.2854E+00 |
| S7 | −6.2774E−01 | 2.9000E+00 | −1.1264E+01 | 3.0527E+01 | −5.6329E+01 | 7.1097E+01 | −6.0506E+01 | 3.3117E+01 | −1.0460E+01 |
| S8 | −1.0135E+00 | 2.7798E+00 | −4.4643E+00 | 2.7667E+00 | 8.6714E−01 | 1.2047E+00 | −9.6284E+00 | 1.4057E+01 | −9.7387E+00 |
| S9 | −3.3028E−01 | −1.5427E+00 | 1.3187E+01 | −3.8629E+01 | 5.6927E+01 | −3.4726E+01 | −2.0616E+01 | 5.8237E+01 | −5.1386E+01 |
| S10 | −1.4048E−01 | 4.6250E−01 | −6.3210E−01 | 1.5852E+00 | −4.1629E+00 | 6.2712E+00 | −5.3386E+00 | 2.5524E+00 | −5.5147E−01 |
| S11 | −6.5810E−01 | 8.9674E−01 | 3.6224E−01 | −4.2197E+00 | 8.5981E+00 | −1.0028E+01 | 7.8031E+00 | −4.2640E+00 | 1.6633E+00 |
| S12 | −1.0078E+00 | 1.6378E+00 | −2.1488E+00 | 2.0501E+00 | −1.4200E+00 | 7.2286E−01 | −2.7308E−01 | 7.6848E−02 | −1.6050E−02 |

Figures 6A, 6B:
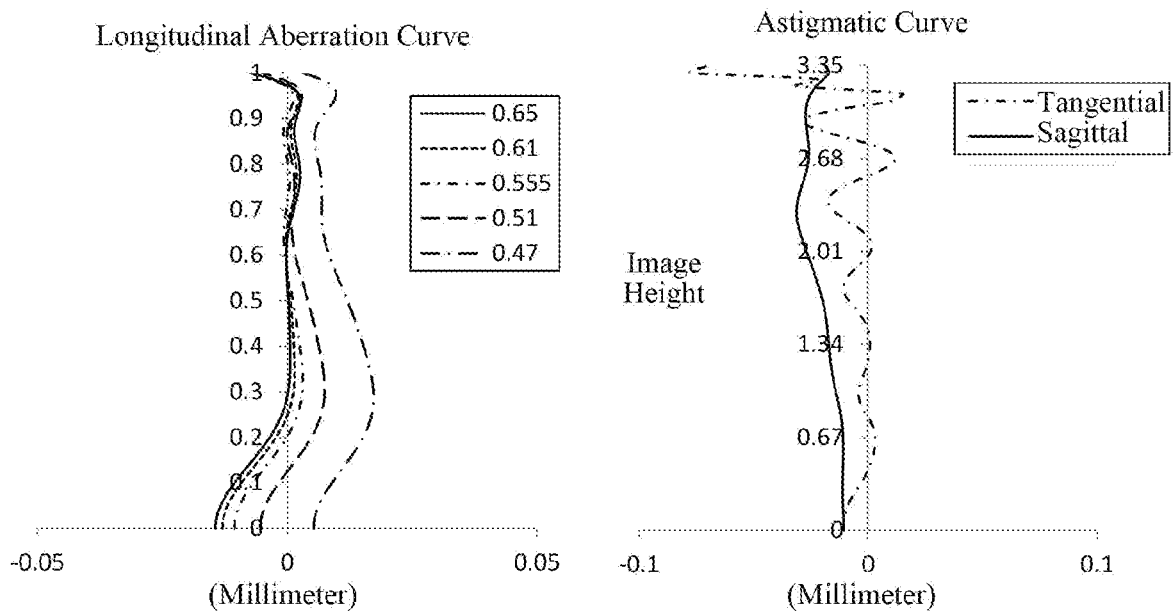
FIGS. 6A to 6D illustrate a longitudinal aberration curve, an astigmatic curve, a distortion curve, and a lateral color curve of the camera lens assembly of the example 3, respectively.
Figure 6C:
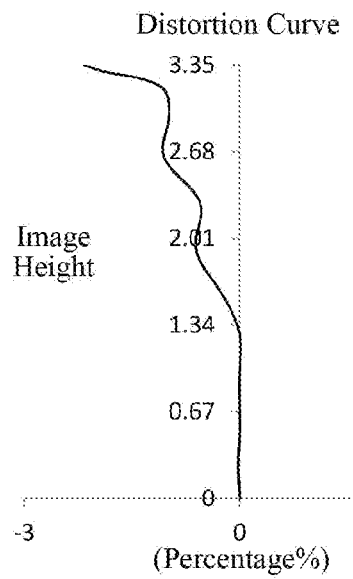
Figure 6D:
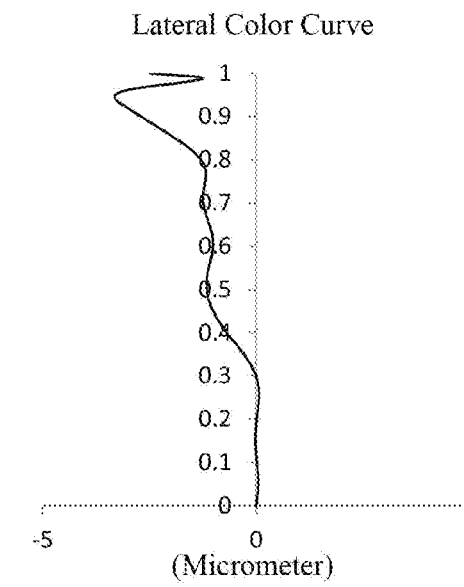

FIG. 6A illustrates a longitudinal aberration curve of the camera lens assembly according to example 3, representing deviations of focal points converged by light of different wavelengths after passing through the lens assembly. FIG. 6B illustrates an astigmatic curve of the camera lens assembly according to example 3, representing a curvature of a tangential plane and a curvature of a sagittal plane. FIG. 6C illustrates a distortion curve of the camera lens assembly according to example 3, representing amounts of distortion corresponding to different image heights. FIG. 6D illustrates a lateral color curve of the camera lens assembly according to example 3, representing deviations of different image heights on an imaging plane after light passes through the lens assembly. It can be seen from FIG. 6A to FIG. 6D that the camera lens assembly provided in example 3 may achieve good image quality.

Example 4

Figure 7:
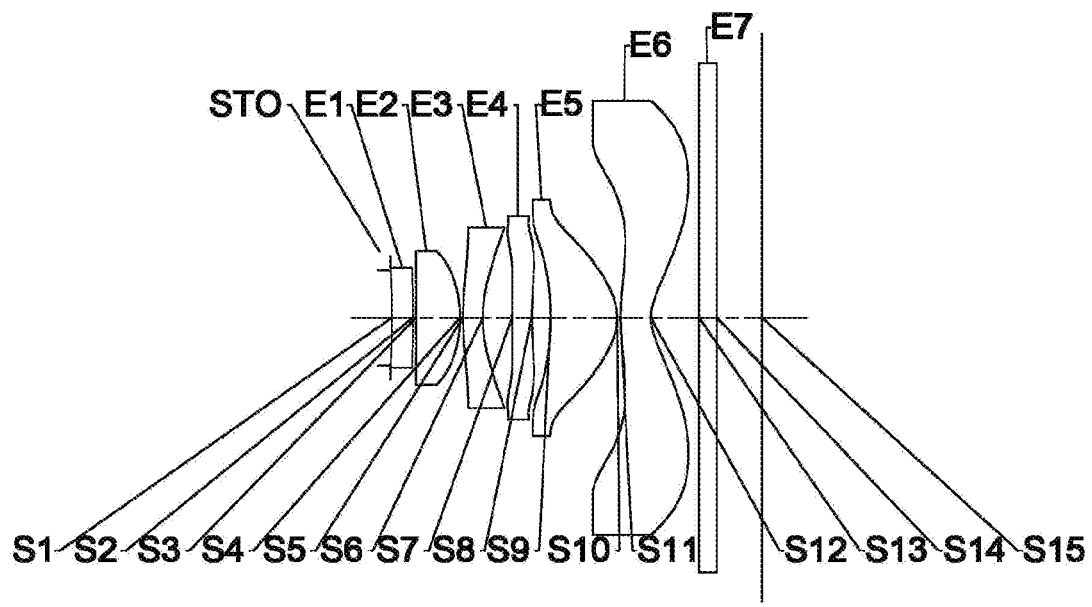
FIG. 7 illustrates a schematic structural view of a camera lens assembly according to example 4 of the present disclosure.

A camera lens assembly according to example 4 of the present disclosure is described below with reference to FIG. 7 to FIG. 8D. FIG. 7 shows a schematic structural view of the camera lens assembly according to example 4 of the present disclosure.

As shown in FIG. 7, the camera lens assembly includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

The first lens E1 has negative refractive power, an object-side surface S1 thereof is concave, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is convex, and an image-side surface S6 thereof is concave. The fourth lens E4 has negative refractive power, an object-side surface S7 thereof is convex, and an image-side surface S8 thereof is concave. The fifth lens E5 has positive refractive power, an object-side surface S9 thereof is concave, and an image-side surface S10 thereof is convex. The sixth lens E6 has negative refractive power, an object-side surface S11 thereof is convex, and an image-side surface S12 thereof is concave. The optical filter E7 has an object-side surface S13 and an image-side surface S14. Light from an object sequentially passes through the respective surfaces S1 to S14 and is finally imaged on the imaging plane S15.

In this example, a total effective focal length f of the camera lens assembly is 2.73 mm, a total length TTL of the camera lens assembly is 4.37 mm, half of a diagonal length ImgH of an effective pixel area on the imaging plane S15 of the camera lens assembly is 3.35 mm, half of a maximum field-of-view Semi-FOV of the camera lens assembly is 51.3°, and an aperture value Fno of the camera lens assembly is 2.42.

Table 7 is a table illustrating basic parameters of the camera lens assembly of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | 0.0161 | | | | |
| S1 | Aspheric | −357.3256 | 0.2503 | 1.62 | 23.5 | −93.59 | 0.0000 |
| S2 | Aspheric | 72.5982 | 0.0351 | | | | 99.0000 |
| S3 | Aspheric | 6.4312 | 0.5203 | 1.55 | 56.1 | 2.37 | 0.1654 |
| S4 | Aspheric | −1.5735 | 0.0350 | | | | 0.0000 |
| S5 | Aspheric | 3.0069 | 0.2335 | 1.67 | 20.4 | −5.04 | −0.0214 |
| S6 | Aspheric | 1.5365 | 0.3456 | | | | 0.0000 |
| S7 | Aspheric | 5.1302 | 0.2300 | 1.62 | 23.5 | −8.70 | 1.5023 |
| S8 | Aspheric | 2.6321 | 0.2257 | | | | 0.0000 |
| S9 | Aspheric | −4.2457 | 0.7877 | 1.55 | 56.1 | 1.16 | 0.0000 |
| S10 | Aspheric | −0.5852 | 0.0350 | | | | −1.0046 |
| S11 | Aspheric | 2.4735 | 0.3600 | 1.54 | 55.9 | −1.28 | 0.0000 |
| S12 | Aspheric | 0.5117 | 0.5696 | | | | −4.4161 |
| S13 | Spherical | Infinite | 0.2100 | 1.52 | 64.2 | | |
| S14 | Spherical | Infinite | 0.5328 | | | | |
| S15 | Spherical | Infinite | | | | | |

TABLE 8

| Surface number | A4 | A6 | A8 | A10 | A12 | A14 | A16 | A18 | A20 |
|---|---|---|---|---|---|---|---|---|---|
| S1 | −1.2750E−01 | −1.5755E−01 | 4.8960E+00 | −5.6946E+01 | 4.0039E+02 | −1.7239E+03 | 4.4480E+03 | −6.3023E+03 | 3.7611E+03 |
| S2 | −3.2930E−01 | 6.1988E−01 | 2.9096E+00 | −4.3813E+01 | 3.0543E+02 | −1.2293E+03 | 2.9295E+03 | −3.8446E+03 | 2.1479E+03 |
| S3 | −3.7534E−01 | 1.0620E+00 | −7.9935E+00 | 6.5969E+01 | −3.6573E+02 | 1.2966E+03 | −2.8156E+03 | 3.4024E+03 | −1.7483E+03 |
| S4 | −5.7469E−02 | −5.1015E−01 | 3.0273E+00 | −1.2480E+01 | 3.2667E+01 | −5.4432E+01 | 5.4177E+01 | −2.8589E+01 | 5.4945E+00 |
| S5 | −1.7684E−01 | 1.0787E−02 | 4.7105E−01 | −1.4987E+00 | 3.0221E+00 | −4.2057E+00 | 3.8138E+00 | −2.0009E+00 | 4.5454E−01 |
| S6 | −2.2561E−01 | 2.3677E−01 | −4.5057E−01 | 8.5300E−01 | −1.1812E+00 | 1.0221E+00 | −5.0258E−01 | 1.2039E−01 | −1.0106E−02 |
| S7 | −4.7016E−01 | 1.5214E+00 | −5.5798E+00 | 1.3919E+01 | −2.2408E+01 | 2.3034E+01 | −1.4472E+01 | 5.0584E+00 | −7.5658E−01 |

TABLE 8-continued

| Surface number | A4 | A6 | A8 | A10 | A12 | A14 | A16 | A18 | A20 |
|---|---|---|---|---|---|---|---|---|---|
| S8 | −5.4613E−01 | 1.1126E+00 | −7.5349E−01 | −5.9810E+00 | 2.3904E+01 | −4.4901E+01 | 4.7956E+01 | −2.4294E+01 | −6.1556E+00 |
| S9 | −1.9126E−01 | 1.6724E−01 | −9.1460E−01 | 1.0982E+01 | −4.7463E+01 | 1.0951E+02 | −1.5543E+02 | 1.4279E+02 | −8.5163E+01 |
| S10 | 1.3743E+00 | −5.9928E+00 | 2.2830E+01 | −6.8654E+01 | 1.5728E+02 | −2.7092E+02 | 3.4966E+02 | −3.3786E+02 | 2.4325E+02 |
| S11 | −3.3789E−01 | 4.2711E−01 | −2.5812E−01 | −3.8631E−01 | 1.0190E+00 | −1.1357E+00 | 8.0404E−01 | −3.9714E−01 | 1.4071E−01 |
| S12 | −1.6263E−01 | 2.8489E−01 | −4.1626E−01 | 4.1244E−01 | −2.8542E−01 | 1.4213E−01 | −5.1736E−02 | 1.3836E−02 | −2.7085E−03 |

Figure 8A:
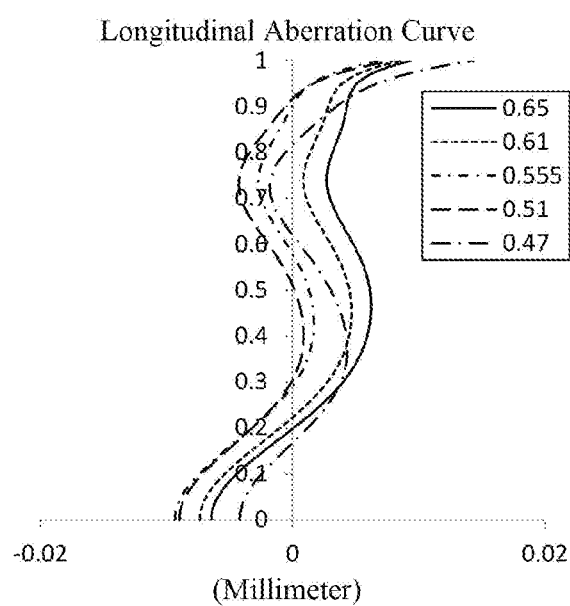
FIGS. 8A to 8D illustrate a longitudinal aberration curve, an astigmatic curve, a distortion curve, and a lateral color curve of the camera lens assembly of the example 4, respectively.
Figure 8B:
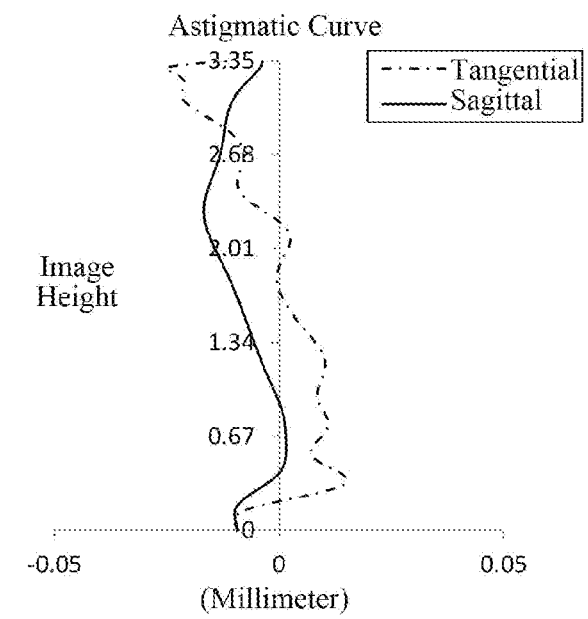
Figure 8C:
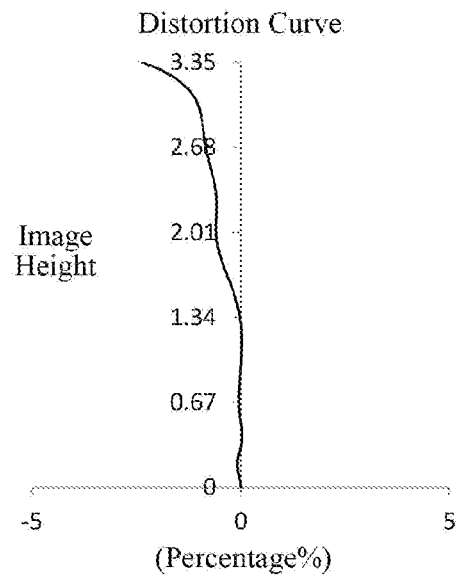
Figure 8D:
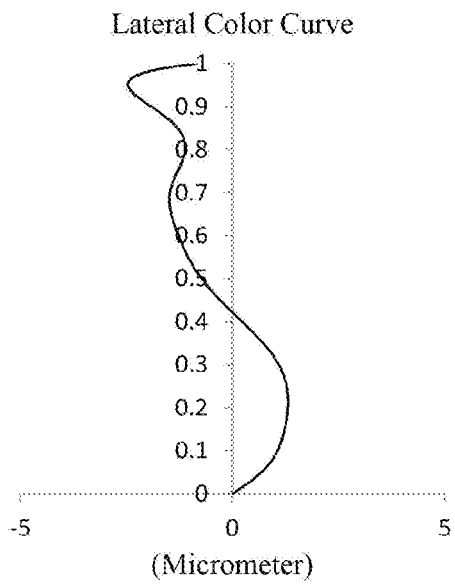

FIG. 8A illustrates a longitudinal aberration curve of the camera lens assembly according to example 4, representing deviations of focal points converged by light of different wavelengths after passing through the lens assembly. FIG. 8B illustrates an astigmatic curve of the camera lens assembly according to example 4, representing a curvature of a tangential plane and a curvature of a sagittal plane. FIG. 8C illustrates a distortion curve of the camera lens assembly according to example 4, representing amounts of distortion corresponding to different image heights. FIG. 8D illustrates a lateral color curve of the camera lens assembly according to example 4, representing deviations of different image heights on an imaging plane after light passes through the lens assembly. It can be seen from FIG. 8A to FIG. 8D that the camera lens assembly provided in example 4 may achieve good image quality.

Example 5

Figure 9:
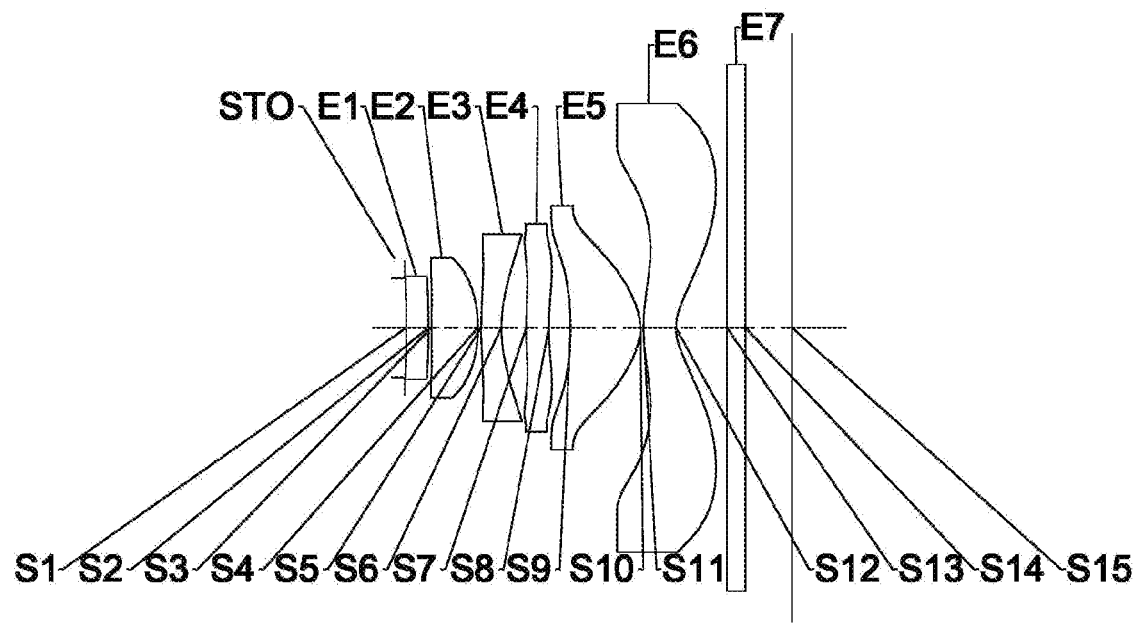
FIG. 9 illustrates a schematic structural view of a camera lens assembly according to example 5 of the present disclosure.

A camera lens assembly according to example 5 of the present disclosure is described below with reference to FIG. 9 to FIG. 10D. FIG. 9 shows a schematic structural view of the camera lens assembly according to example 5 of the present disclosure.

As shown in FIG. 9, the camera lens assembly includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

The first lens E1 has positive refractive power, an object-side surface S1 thereof is concave, and an image-side surface S2 thereof is convex. The second lens E2 has positive refractive power, an object-side surface S3 thereof is convex, and an image-side surface S4 thereof is convex. The third lens E3 has negative refractive power, an object-side surface S5 thereof is convex, and an image-side surface S6 thereof is concave. The fourth lens E4 has negative refractive power, an object-side surface S7 thereof is convex, and an image-side surface S8 thereof is concave. The fifth lens E5 has positive refractive power, an object-side surface S9 thereof is concave, and an image-side surface S10 thereof is convex. The sixth lens E6 has negative refractive power, an object-side surface S11 thereof is convex, and an image-side surface S12 thereof is concave. The optical filter E7 has an object-side surface S13 and an image-side surface S14. Light from an object sequentially passes through the respective surfaces S1 to S14 and is finally imaged on the imaging plane S15.

In this example, a total effective focal length f of the camera lens assembly is 2.72 mm, a total length TTL of the camera lens assembly is 4.39 mm, half of a diagonal length ImgH of an effective pixel area on the imaging plane S15 of the camera lens assembly is 3.35 mm, half of a maximum field-of-view Semi-FOV of the camera lens assembly is 51.3°, and an aperture value Fno of the camera lens assembly is 2.41.

Table 9 is a table illustrating basic parameters of the camera lens assembly of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | 0.0146 | | | | |
| S1 | Aspheric | −114.3881 | 0.2518 | 1.62 | 23.5 | 64.29 | 0.0000 |
| S2 | Aspheric | −30.4468 | 0.0350 | | | | −99.0000 |
| S3 | Aspheric | 6.8020 | 0.5295 | 1.55 | 56.1 | 2.44 | −9.6257 |
| S4 | Aspheric | −1.6123 | 0.0350 | | | | 0.0000 |
| S5 | Aspheric | 4.1615 | 0.2320 | 1.67 | 20.4 | −4.45 | 0.3341 |
| S6 | Aspheric | 1.6917 | 0.2832 | | | | 0.0000 |
| S7 | Aspheric | 4.0369 | 0.2554 | 1.62 | 23.5 | −10.92 | 1.6763 |
| S8 | Aspheric | 2.5020 | 0.2478 | | | | 0.0000 |
| S9 | Aspheric | −3.6150 | 0.7950 | 1.55 | 56.1 | 1.20 | 0.0000 |
| S10 | Aspheric | −0.5973 | 0.0350 | | | | −1.0023 |
| S11 | Aspheric | 2.0449 | 0.3683 | 1.54 | 55.9 | −1.34 | −1.0000 |
| S12 | Aspheric | 0.4986 | 0.5813 | | | | −4.2335 |
| S13 | Spherical | Infinite | 0.2100 | 1.52 | 64.2 | | |
| S14 | Spherical | Infinite | 0.5307 | | | | |
| S15 | Spherical | Infinite | | | | | |

TABLE 10

| Surface number | A4 | A6 | A8 | A10 | A12 | A14 | A16 | A18 | A20 |
|---|---|---|---|---|---|---|---|---|---|
| S1 | −1.0171E−01 | −3.0669E−01 | 7.3998E+00 | −8.1665E+01 | 5.5934E+02 | −2.3927E+03 | 6.2266E+03 | −9.0063E+03 | 5.5442E+03 |
| S2 | −3.3583E−01 | 1.0659E+00 | −1.6895E+00 | −6.6699E+00 | 9.7743E+01 | −4.7673E+02 | 1.2524E+03 | −1.7622E+03 | 1.0533E+03 |
| S3 | −4.1439E−01 | 1.3265E+00 | −9.6256E+00 | 7.4644E+01 | −4.0712E+02 | 1.4331E+03 | −3.0920E+03 | 3.7059E+03 | −1.8805E+03 |
| S4 | −9.3142E−02 | −1.0268E+00 | 8.0860E+00 | −3.9023E+01 | 1.1843E+02 | −2.2527E+02 | 2.4721E+02 | −1.1749E+02 | −2.2883E+01 |
| S5 | −1.4208E−01 | −4.1944E−01 | 2.9217E+00 | −1.0188E+01 | 2.3165E+01 | −3.4592E+01 | 3.2472E+01 | −1.7308E+01 | 3.9895E+00 |
| S6 | −1.6157E−01 | 5.9533E−02 | −2.7317E−03 | 7.7584E−02 | −2.8030E−01 | 3.0431E−01 | −8.9284E−02 | −4.5301E−02 | 2.3216E−02 |
| S7 | −4.6051E−01 | 1.6373E+00 | −8.5133E+00 | 3.4035E+01 | −9.5300E+01 | 1.8647E+02 | −2.5526E+02 | 2.4233E+02 | −1.5505E+02 |
| S8 | −4.5853E−01 | 4.6053E−01 | 4.1687E+00 | −3.9332E+01 | 1.7637E+02 | −5.1016E+02 | 1.0318E+03 | −1.5054E+03 | 1.5978E+03 |
| S9 | −3.4195E−02 | −6.9730E−01 | 5.8893E+00 | −2.6903E+01 | 8.5171E+01 | −2.0737E+02 | 3.9418E+02 | −5.6884E+02 | 6.0314E+02 |
| S10 | 1.3441E+00 | −5.8411E+00 | 2.3513E+01 | −7.6070E+01 | 1.8728E+02 | −3.4664E+02 | 4.8093E+02 | −4.9852E+02 | 3.8295E+02 |
| S11 | −3.6325E−01 | 6.6386E−01 | −1.0940E+00 | 9.6562E−01 | −2.2008E−01 | −4.5432E−01 | 5.9971E−01 | −3.8914E−01 | 1.6117E−01 |
| S12 | −1.3661E−01 | 2.8248E−01 | −5.4784E−01 | 6.6810E−01 | −5.3844E−01 | 3.0161E−01 | −1.2093E−01 | 3.5202E−02 | −7.4534E−03 |

Figures 10A, 10B:
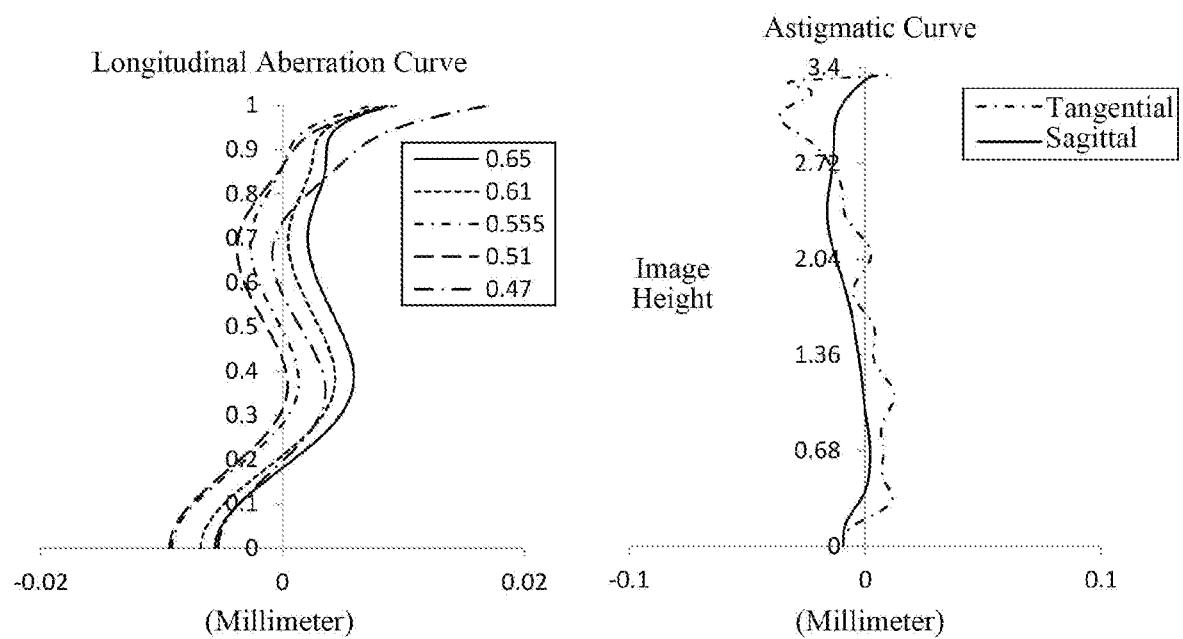
FIGS. 10A to 10D illustrate a longitudinal aberration curve, an astigmatic curve, a distortion curve, and a lateral color curve of the camera lens assembly of the example 5, respectively.
Figure 10C:
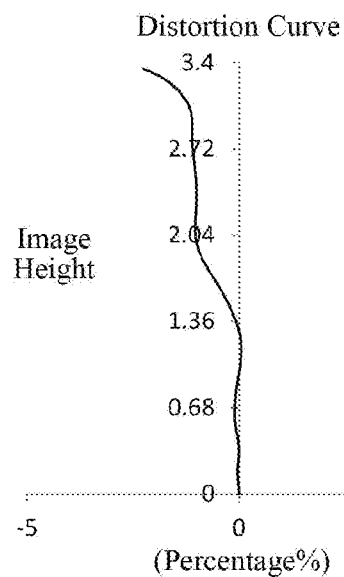
Figure 10D:
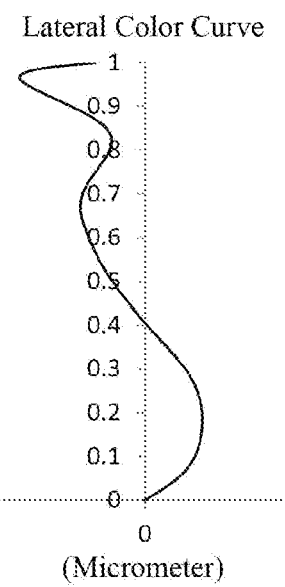

FIG. 10A illustrates a longitudinal aberration curve of the camera lens assembly according to example 5, representing deviations of focal points converged by light of different wavelengths after passing through the lens assembly. FIG. 10B illustrates an astigmatic curve of the camera lens assembly according to example 5, representing a curvature of a tangential plane and a curvature of a sagittal plane. FIG. 10C illustrates a distortion curve of the camera lens assembly according to example 5, representing amounts of distortion corresponding to different image heights. FIG. 10D illustrates a lateral color curve of the camera lens assembly according to example 5, representing deviations of different image heights on an imaging plane after light passes through the lens assembly. It can be seen from FIG. 10A to FIG. 10D that the camera lens assembly provided in example 5 may achieve good image quality.

Example 6

Figure 11:
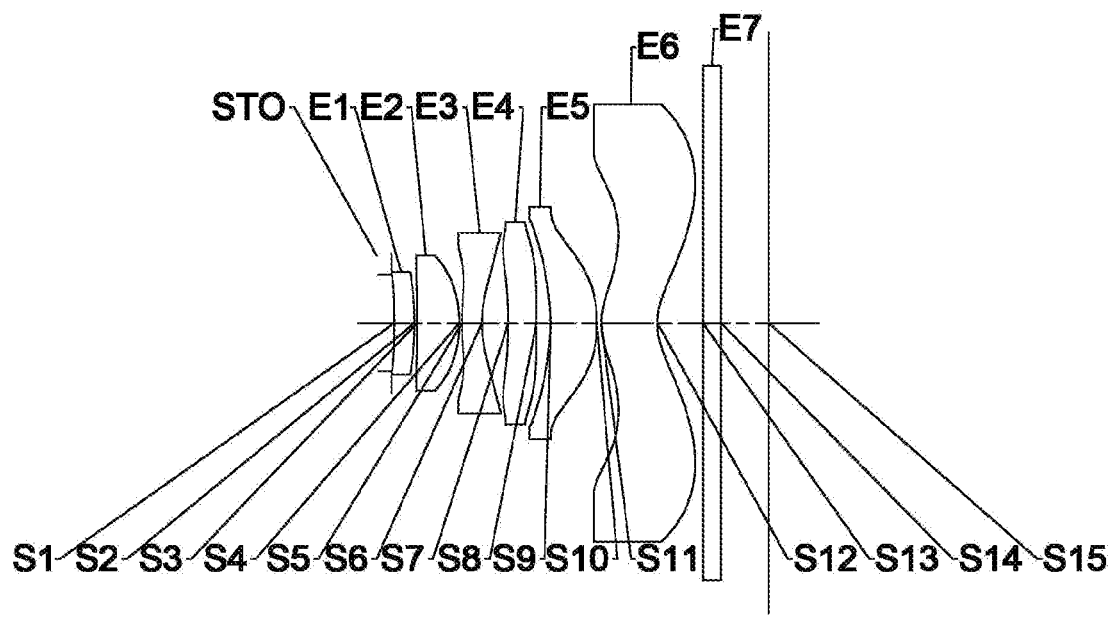
FIG. 11 illustrates a schematic structural view of a camera lens assembly according to example 6 of the present disclosure.

A camera lens assembly according to example 6 of the present disclosure is described below with reference to FIG. 11 to FIG. 12D. FIG. 11 shows a schematic structural view of the camera lens assembly according to example 6 of the present disclosure.

As shown in FIG. 11, the camera lens assembly includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

The first lens E1 has positive refractive power, an object-side surface S1 thereof is concave, and an image-side surface S2 thereof is convex. The second lens E2 has positive refractive power, an object-side surface S3 thereof is convex, and an image-side surface S4 thereof is convex. The third lens E3 has negative refractive power, an object-side surface S5 thereof is convex, and an image-side surface S6 thereof is concave. The fourth lens E4 has negative refractive power, an object-side surface S7 thereof is concave, and an image-side surface S8 thereof is convex. The fifth lens E5 has negative refractive power, an object-side surface S9 thereof is concave, and an image-side surface S10 thereof is convex. The sixth lens E6 has positive refractive power, an object-side surface S11 thereof is convex, and an image-side surface S12 thereof is concave. The optical filter E7 has an object-side surface S13 and an image-side surface S14. Light from an object sequentially passes through the respective surfaces S1 to S14 and is finally imaged on the imaging plane S15.

In this example, a total effective focal length f of the camera lens assembly is 2.72 mm, a total length TTL of the camera lens assembly is 4.37 mm, half of a diagonal length ImgH of an effective pixel area on the imaging plane S15 of the camera lens assembly is 3.32 mm, half of a maximum field-of-view Semi-FOV of the camera lens assembly is 51.1°, and an aperture value Fno of the camera lens assembly is 2.42.

Table 11 is a table illustrating basic parameters of the camera lens assembly of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

TABLE 11

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | 0.0318 | | | | |
| S1 | Aspheric | −27.8006 | 0.2350 | 1.62 | 23.5 | 11.44 | 0.0000 |
| S2 | Aspheric | −5.8486 | 0.0300 | | | | 0.0000 |
| S3 | Aspheric | 34.8228 | 0.4945 | 1.55 | 56.1 | 2.33 | 0.0000 |
| S4 | Aspheric | −1.3161 | 0.0300 | | | | 0.0000 |
| S5 | Aspheric | 3.5581 | 0.2313 | 1.67 | 20.4 | −3.32 | 0.0000 |
| S6 | Aspheric | 1.3290 | 0.3080 | | | | 0.0000 |
| S7 | Aspheric | −5.8249 | 0.3292 | 1.62 | 23.5 | −20.12 | 0.0000 |
| S8 | Aspheric | −10.8068 | 0.1651 | | | | 0.0000 |
| S9 | Aspheric | −1.3726 | 0.5400 | 1.55 | 56.1 | −18.87 | 0.0000 |
| S10 | Aspheric | −1.8036 | 0.0498 | | | | −0.0051 |
| S11 | Aspheric | 0.7521 | 0.6564 | 1.54 | 55.9 | 4.23 | −1.0000 |
| S12 | Aspheric | 0.7821 | 0.5311 | | | | −1.0000 |

TABLE 11-continued

| Surface number | Surface type | Radius of curvature | Thickness/ Distance | Material Refractive index | Abbe number | Focal length | Conic coefficient |
|---|---|---|---|---|---|---|---|
| S13 | Spherical | Infinite | 0.2100 | 1.52 | 64.2 | | |
| S14 | Spherical | Infinite | 0.5576 | | | | |
| S15 | Spherical | Infinite | | | | | |

TABLE 12

| Surface number | A4 | A6 | A8 | A10 | A12 | A14 | A16 | A18 | A20 |
|---|---|---|---|---|---|---|---|---|---|
| S1 | −2.3119E−01 | −8.7181E−02 | −7.3833E−02 | 2.0763E+01 | −2.4471E+02 | 1.4085E+03 | −4.4298E+03 | 7.3378E+03 | −5.0336E+03 |
| S2 | −4.0015E−01 | 2.7647E−01 | 1.0408E+01 | −1.2405E+02 | 8.5238E+02 | −3.5912E+03 | 9.0947E+03 | −1.2628E+04 | 7.3672E+03 |
| S3 | −2.7732E−01 | 7.0068E−01 | −1.2239E+00 | 7.3139E+00 | −4.8862E+01 | 1.7224E+02 | −3.1206E+02 | 2.8166E+02 | −9.7673E+01 |
| S4 | 5.0994E−01 | −5.9587E+00 | 4.0480E+01 | −1.9561E+02 | 6.6375E+02 | −1.5661E+03 | 2.4958E+03 | −2.5332E+03 | 1.4563E+03 |
| S5 | 6.9090E−02 | −4.0630E+00 | 2.5996E+01 | −1.1931E+02 | 4.0523E+02 | −1.0134E+03 | 1.8330E+03 | −2.3273E+03 | 1.9901E+03 |
| S6 | −3.5952E−01 | 3.4893E−01 | −1.7417E+00 | 8.3080E+00 | −2.5343E+01 | 5.1952E+01 | −7.5166E+01 | 7.8401E+01 | −5.8356E+01 |
| S7 | 1.1420E−01 | −3.1608E+00 | 2.3266E+01 | −9.8963E+01 | 2.8112E+02 | −5.6043E+02 | 8.0537E+02 | −8.4153E+02 | 6.3262E+02 |
| S8 | 8.2720E−01 | −7.0587E+00 | 3.1945E+01 | −1.1157E+02 | 3.4491E+02 | −9.1799E+02 | 1.9310E+03 | −3.0415E+03 | 3.4958E+03 |
| S9 | 2.1385E+00 | −1.2245E+01 | 5.6387E+01 | −2.3254E+02 | 7.9427E+02 | −2.0429E+03 | 3.8272E+03 | −5.1976E+03 | 5.1049E+03 |
| S10 | −4.5694E−01 | 9.5683E−01 | −7.2141E−02 | −1.1424E+01 | 4.6951E+01 | −9.8131E+01 | 1.2705E+02 | −1.0749E+02 | 5.8492E+01 |
| S11 | −1.2635E+00 | 3.0615E+00 | −8.2280E+00 | 1.6538E+01 | −2.2878E+01 | 2.2084E+01 | −1.5219E+01 | 7.5978E+00 | −2.7567E+00 |
| S12 | −5.4987E−01 | 3.8108E−01 | −2.8248E−01 | 3.1687E−01 | −3.3429E−01 | 2.4349E−01 | −1.2007E−01 | 4.1081E−02 | −9.9080E−03 |

Figure 12A:
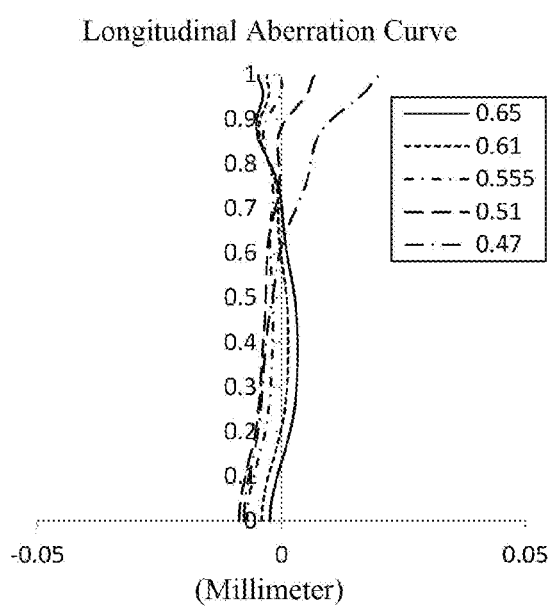
FIGS. 12A to 12D illustrate a longitudinal aberration curve, an astigmatic curve, a distortion curve, and a lateral color curve of the camera lens assembly of the example 6, respectively.
Figure 12B:
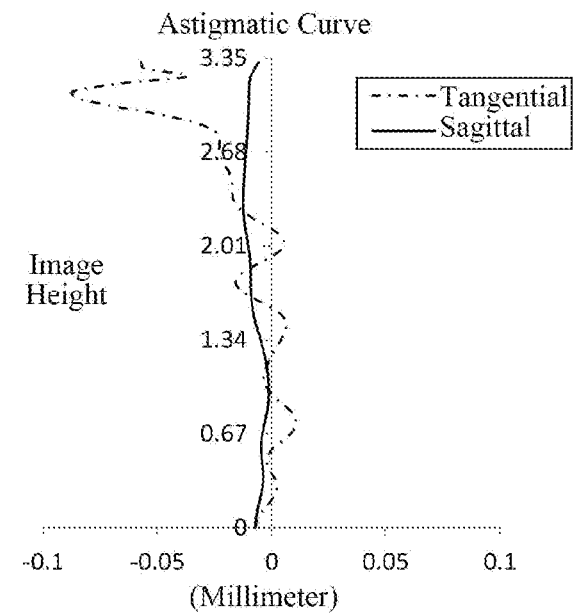
Figure 12C:
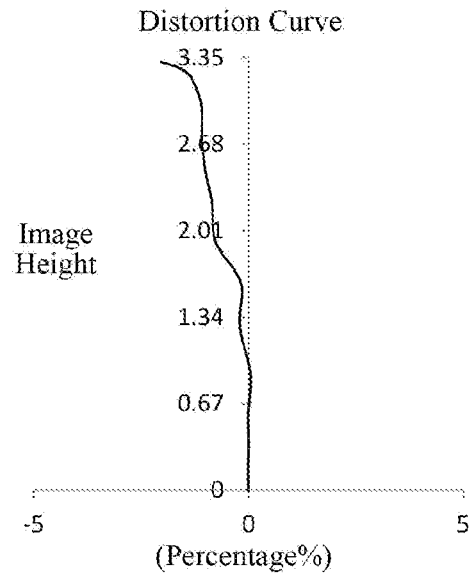
Figure 12D:
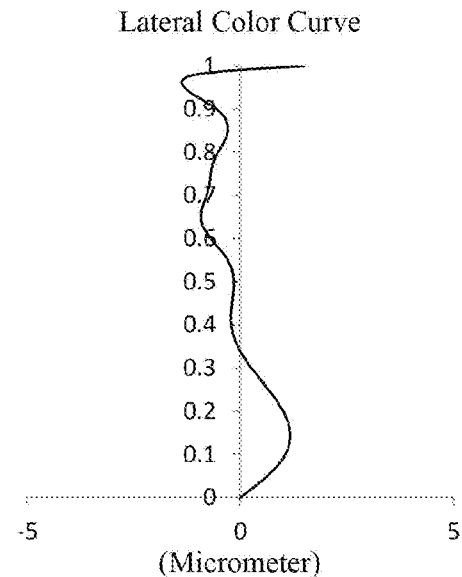

FIG. 12A illustrates a longitudinal aberration curve of the camera lens assembly according to example 6, representing deviations of focal points converged by light of different wavelengths after passing through the lens assembly. FIG. 12B illustrates an astigmatic curve of the camera lens assembly according to example 6, representing a curvature of a tangential plane and a curvature of a sagittal plane. FIG. 12C illustrates a distortion curve of the camera lens assembly according to example 6, representing amounts of distortion corresponding to different image heights. FIG. 12D illustrates a lateral color curve of the camera lens assembly according to example 6, representing deviations of different image heights on an imaging plane after light passes through the lens assembly. It can be seen from FIG. 12A to FIG. 12D that the camera lens assembly provided in example 6 may achieve good image quality.

Example 7

Figure 13:
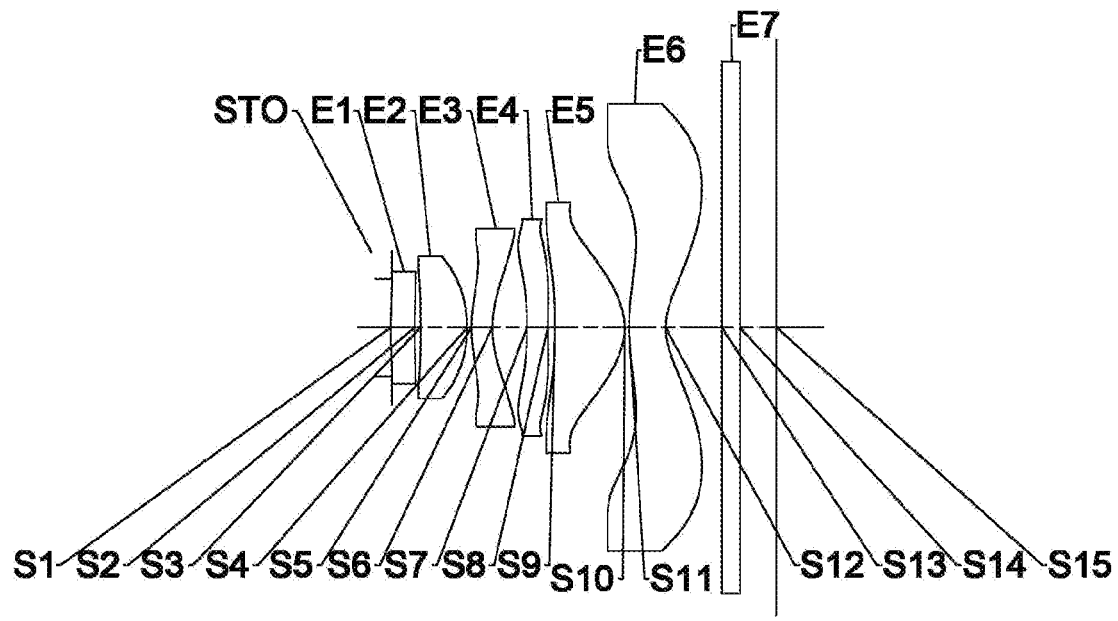
FIG. 13 illustrates a schematic structural view of a camera lens assembly according to example 7 of the present disclosure.

A camera lens assembly according to example 7 of the present disclosure is described below with reference to FIG. 13 to FIG. 14D. FIG. 13 shows a schematic structural view of the camera lens assembly according to example 7 of the present disclosure.

As shown in FIG. 13, the camera lens assembly includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

The first lens E1 has positive refractive power, an object-side surface S1 thereof is convex, and an image-side surface S2 thereof is concave. The second lens E2 has positive refractive power, an object-side surface S3 thereof is concave, and an image-side surface S4 thereof is convex. The third lens E3 has negative refractive power, an object-side surface S5 thereof is convex, and an image-side surface S6 thereof is concave. The fourth lens E4 has negative refractive power, an object-side surface S7 thereof is concave, and an image-side surface S8 thereof is concave. The fifth lens E5 has positive refractive power, an object-side surface S9 thereof is concave, and an image-side surface S10 thereof is convex. The sixth lens E6 has negative refractive power, an object-side surface S11 thereof is convex, and an image-side surface S12 thereof is concave. The optical filter E7 has an object-side surface S13 and an image-side surface S14. Light from an object sequentially passes through the respective surfaces S1 to S14 and is finally imaged on the imaging plane S15.

In this example, a total effective focal length f of the camera lens assembly is 2.72 mm, a total length TTL of the camera lens assembly is 4.46 mm, half of a diagonal length ImgH of an effective pixel area on the imaging plane S15 of the camera lens assembly is 3.32 mm, half of a maximum field-of-view Semi-FOV of the camera lens assembly is 51.1°, and an aperture value Fno of the camera lens assembly is 2.41.

Table 13 is a table illustrating basic parameters of the camera lens assembly of example 7, wherein the units for the radius of curvature, the thickness/distance and the focal length are millimeter (mm). Table 14 shows high-order coefficients applicable to each aspheric surface in example 7, wherein the surface shape of each aspheric surface may be defined by the formula (1) given in the above example 1.

TABLE 13

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.0132 | | | | |
| S1 | Aspheric | 5.6347 | 0.2777 | 1.62 | 23.5 | 35.07 | 18.3554 |
| S2 | Aspheric | 7.3607 | 0.0700 | | | | −38.0739 |
| S3 | Aspheric | −29.6507 | 0.5379 | 1.55 | 56.1 | 2.71 | 99.0000 |
| S4 | Aspheric | −1.4193 | 0.0500 | | | | 0.2020 |
| S5 | Aspheric | 1.8319 | 0.2400 | 1.67 | 20.4 | −7.12 | −1.2992 |
| S6 | Aspheric | 1.2519 | 0.4025 | | | | −0.1356 |
| S7 | Aspheric | −3.9718 | 0.2400 | 1.62 | 23.5 | −3.82 | −0.1162 |
| S8 | Aspheric | 6.6183 | 0.0802 | | | | −1.0000 |
| S9 | Aspheric | −50.3872 | 0.8096 | 1.55 | 56.1 | 1.34 | −99.0000 |
| S10 | Aspheric | −0.7271 | 0.0500 | | | | −1.0000 |
| S11 | Aspheric | 2.5370 | 0.4216 | 1.54 | 55.9 | −1.86 | 0.0132 |
| S12 | Aspheric | 0.6754 | 0.6533 | | | | −4.6502 |
| S13 | Spherical | Infinite | 0.2100 | 1.52 | 64.2 | | |
| S14 | Spherical | Infinite | 0.4205 | | | | |
| S15 | Spherical | Infinite | | | | | |

TABLE 14

| Surface number | A4 | A6 | A8 | A10 | A12 | A14 | A16 | A18 | A20 |
|---|---|---|---|---|---|---|---|---|---|
| S1 | −1.6134E−01 | 8.4502E−01 | −1.5314E+01 | 1.5691E+02 | −9.8648E+02 | 3.8415E+03 | −8.9765E+03 | 1.1450E+04 | −6.0722E+03 |
| S2 | −1.2494E−01 | −2.6966E−01 | 3.7621E+00 | −3.3813E+01 | 2.0172E+02 | −7.4849E+02 | 1.7232E+03 | −2.2241E+03 | 1.2152E+03 |
| S3 | −9.5179E−02 | −1.7656E−01 | 3.1764E−01 | −3.1809E+00 | 3.7337E+01 | −1.9855E+02 | 5.9098E+02 | −8.9534E+02 | 5.3296E+02 |
| S4 | 9.8435E−02 | −2.1974E+00 | 1.7930E+01 | −8.9313E+01 | 2.8170E+02 | −5.6619E+02 | 7.0299E+02 | −4.9113E+02 | 1.4753E+02 |
| S5 | −1.6625E−01 | −8.8799E−01 | 5.3955E+00 | −1.9056E+01 | 4.2072E+01 | −5.8666E+01 | 5.0272E+01 | −2.4175E+01 | 4.9950E+00 |
| S6 | −2.2922E−01 | −3.2037E−01 | 1.5856E+00 | −4.1679E+00 | 6.8651E+00 | −7.1728E+00 | 4.5934E+00 | −1.6437E+00 | 2.5018E−01 |
| S7 | −3.4663E−02 | −8.7286E−02 | −9.5073E−02 | 1.8235E+00 | −4.3178E+00 | 5.1408E+00 | −3.4696E+00 | 1.2636E+00 | −1.9357E−01 |
| S8 | −3.3961E−01 | 3.3671E−01 | 2.6472E−01 | −1.5500E+00 | 2.3944E+00 | −1.9466E+00 | 8.8769E−01 | −2.0339E−01 | 1.5947E−02 |
| S9 | −3.2846E−01 | 2.5719E−01 | 1.3181E+00 | −4.2019E+00 | 5.8355E+00 | −4.6107E+00 | 2.1584E+00 | −5.6257E−01 | 6.3227E−02 |
| S10 | 5.8190E−01 | −1.6353E+00 | 4.0260E+00 | −7.2531E+00 | 9.4549E+00 | −8.7246E+00 | 5.4915E+00 | −2.1452E+00 | 3.5493E−01 |
| S11 | −2.1870E−01 | 2.4132E−01 | −2.8392E−01 | 2.1006E−01 | −9.6928E−02 | 2.7931E−02 | −4.8617E−03 | 4.6647E−04 | −1.8936E−05 |
| S12 | −6.4331E−02 | 2.2159E−02 | −1.1056E−02 | 4.9467E−03 | −1.4807E−03 | 2.6900E−04 | −2.8120E−05 | 1.5028E−06 | −2.9037E−08 |

Figures 14A, 14B:
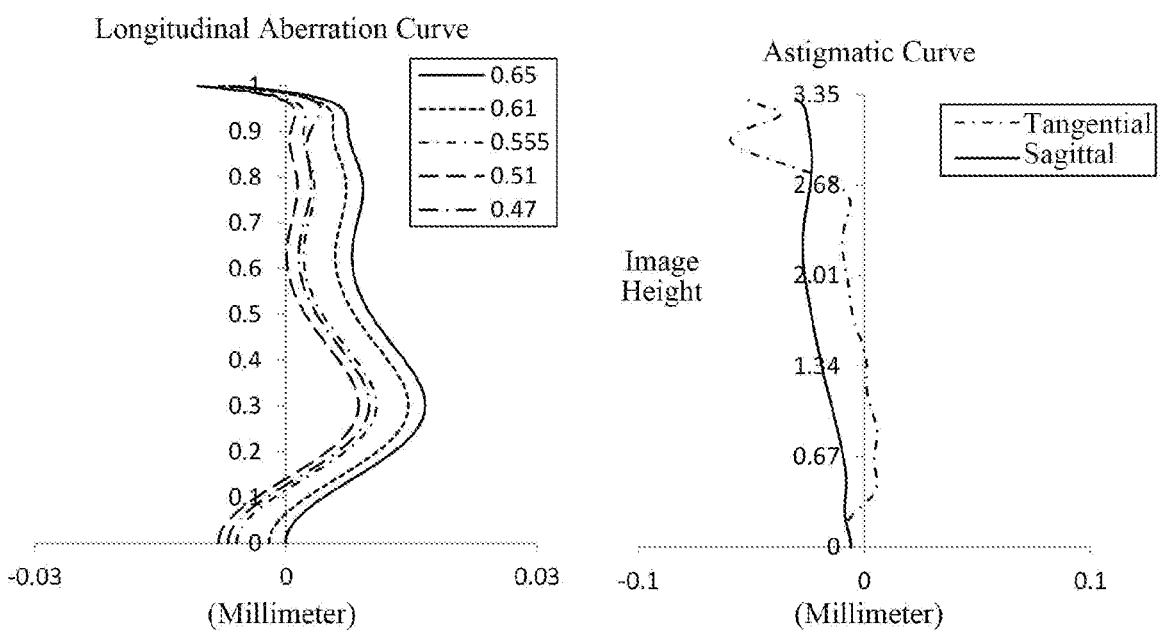
FIGS. 14A to 14D illustrate a longitudinal aberration curve, an astigmatic curve, a distortion curve, and a lateral color curve of the camera lens assembly of the example 7, respectively.
Figure 14C:
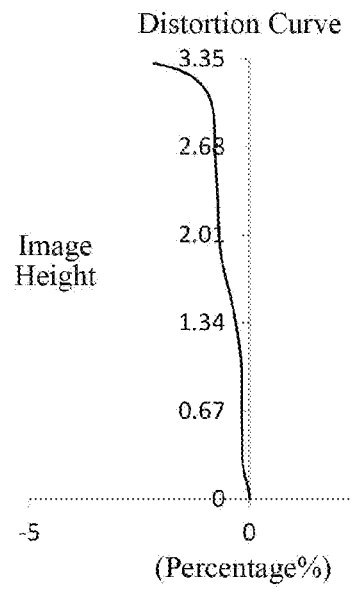
Figure 14D:
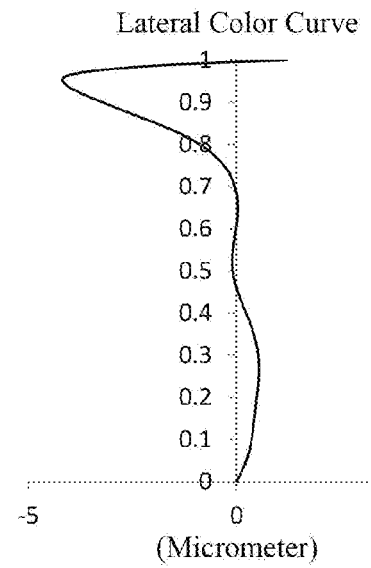

FIG. 14A illustrates a longitudinal aberration curve of the camera lens assembly according to example 7, representing deviations of focal points converged by light of different wavelengths after passing through the lens assembly. FIG. 14B illustrates an astigmatic curve of the camera lens assembly according to example 7, representing a curvature of a tangential plane and a curvature of a sagittal plane. FIG. 14C illustrates a distortion curve of the camera lens assembly according to example 7, representing amounts of distortion corresponding to different image heights. FIG. 14D illustrates a lateral color curve of the camera lens assembly according to example 7, representing deviations of different image heights on an imaging plane after light passes through the lens assembly. It can be seen from FIG. 14A to FIG. 14D that the camera lens assembly provided in example 7 may achieve good image quality.

Example 8

Figure 15:
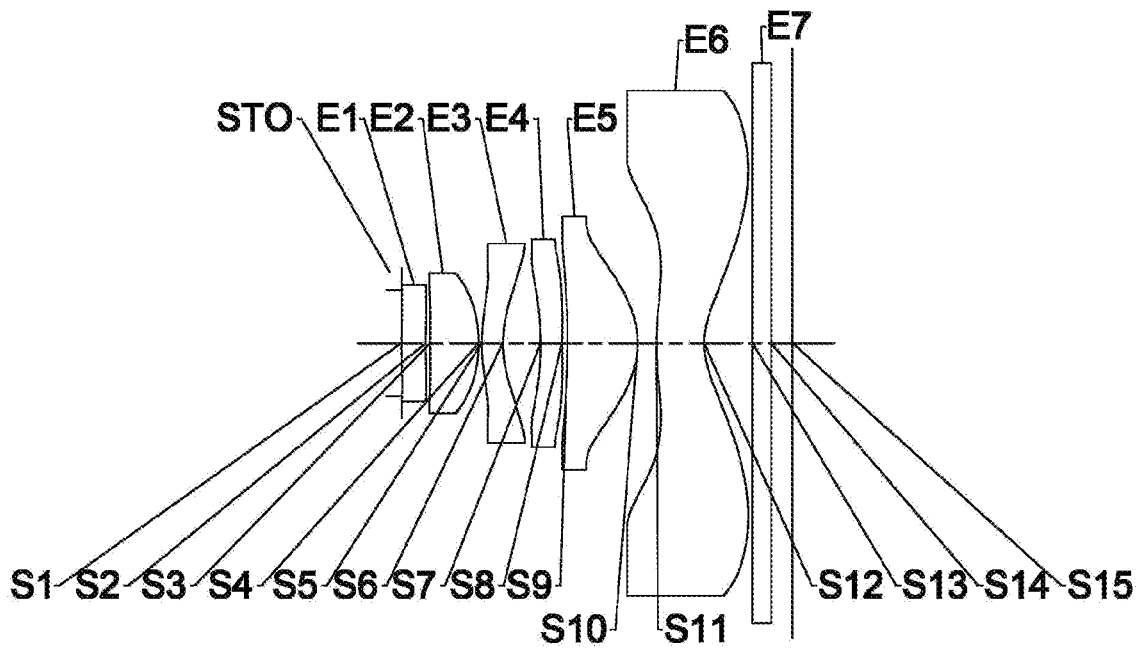
FIG. 15 illustrates a schematic structural view of a camera lens assembly according to example 8 of the present disclosure.

A camera lens assembly according to example 8 of the present disclosure is described below with reference to FIG. 15 to FIG. 16D. FIG. 15 shows a schematic structural view of the camera lens assembly according to example 8 of the present disclosure.

As shown in FIG. 15, the camera lens assembly includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is convex, and an image-side surface S6 thereof is concave. The fourth lens E4 has negative refractive power, an object-side surface S7 thereof is concave, and an image-side surface S8 thereof is concave. The fifth lens E5 has positive refractive power, an object-side surface S9 thereof is convex, and an image-side surface S10 thereof is convex. The sixth lens E6 has negative refractive power, an object-side surface S11 thereof is convex, and an image-side surface S12 thereof is concave. The optical filter E7 has an object-side surface S13 and an image-side surface S14. Light from an object sequentially passes through the respective surfaces S1 to S14 and is finally imaged on the imaging plane S15.

In this example, a total effective focal length f of the camera lens assembly is 2.70 mm, a total length TTL of the camera lens assembly is 4.41 mm, half of a diagonal length ImgH of an effective pixel area on the imaging plane S15 of the camera lens assembly is 3.32 mm, half of a maximum field-of-view Semi-FOV of the camera lens assembly is 51.5°, and an aperture value Fno of the camera lens assembly is 2.25.

Table 15 is a table illustrating basic parameters of the camera lens assembly of example 8, wherein the units for the radius of curvature, the thickness/distance and the focal length are millimeter (mm). Table 16 shows high-order coefficients applicable to each aspheric surface in example 8, wherein the surface shape of each aspheric surface may be defined by the formula (1) given in the above example 1.

TABLE 15

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.0035 | | | | |
| S1 | Aspheric | 6.7642 | 0.2754 | 1.62 | 23.5 | 129.60 | 0.6676 |
| S2 | Aspheric | 7.2427 | 0.0503 | | | | −99.0000 |
| S3 | Aspheric | 24.0335 | 0.5484 | 1.55 | 56.1 | 2.54 | 0.0000 |
| S4 | Aspheric | −1.4601 | 0.0300 | | | | 0.2677 |
| S5 | Aspheric | 1.8537 | 0.2400 | 1.67 | 20.4 | −7.16 | −1.4415 |
| S6 | Aspheric | 1.2657 | 0.4279 | | | | −0.1228 |
| S7 | Aspheric | −3.8921 | 0.2400 | 1.62 | 23.5 | −3.98 | 0.6900 |
| S8 | Aspheric | 7.7358 | 0.0606 | | | | −1.0000 |
| S9 | Aspheric | 31.2869 | 0.7940 | 1.55 | 56.1 | 1.81 | 99.0000 |
| S10 | Aspheric | −1.0125 | 0.2068 | | | | −1.0000 |
| S11 | Aspheric | 2.5364 | 0.5411 | 1.54 | 55.9 | −2.75 | 0.0298 |
| S12 | Aspheric | 0.8638 | 0.5475 | | | | −1.0000 |
| S13 | Spherical | Infinite | 0.2100 | 1.52 | 64.2 | | |
| S14 | Spherical | Infinite | 0.2392 | | | | |
| S15 | Spherical | Infinite | | | | | |

TABLE 16

| Surface number | A4 | A6 | A8 | A10 | A12 | A14 | A16 | A18 | A20 |
|---|---|---|---|---|---|---|---|---|---|
| S1 | −1.6536E−01 | 3.4357E−01 | −6.5170E+00 | 6.6905E+01 | −4.2412E+02 | 1.6664E+03 | −3.9280E+03 | 5.0746E+03 | −2.7565E+03 |
| S2 | −1.4334E−01 | −3.1711E−01 | 3.7077E+00 | −3.3800E+01 | 2.0172E+02 | −7.4849E+02 | 1.7232E+03 | −2.2241E+03 | 1.2152E+03 |
| S3 | −7.1655E−02 | −2.6117E−01 | 1.0766E−01 | 4.8003E+00 | −3.8619E+01 | 1.5676E+02 | −3.1567E+02 | 3.0094E+02 | −1.0577E+02 |
| S4 | −1.8457E−02 | −2.7155E−01 | 3.5606E+00 | −2.3402E+01 | 8.5293E+01 | −1.8816E+02 | 2.5089E+02 | −1.8669E+02 | 5.9472E+01 |
| S5 | −2.8790E−01 | 3.5398E−01 | −1.0616E+00 | 1.9181E+00 | −2.4651E+00 | 2.7726E+00 | −2.5485E+00 | 1.3856E+00 | −2.8977E−01 |
| S6 | −3.0936E−01 | 2.0261E−01 | −2.1898E−01 | −1.8973E−01 | 1.0447E+00 | −1.5516E+00 | 1.1600E+00 | −4.4953E−01 | 7.1724E−02 |
| S7 | −1.4149E−01 | 6.2327E−01 | −2.2990E+00 | 5.9573E+00 | −9.3247E+00 | 9.0097E+00 | −5.2755E+00 | 1.7157E+00 | −2.3802E−01 |
| S8 | −5.4517E−01 | 1.6668E+00 | −3.2960E+00 | 4.0199E+00 | −3.1215E+00 | 1.5412E+00 | −4.6111E−01 | 7.8898E−02 | −6.9779E−03 |
| S9 | −4.8263E−01 | 1.4533E+00 | −2.2390E+00 | 1.8314E+00 | −6.6792E−01 | −9.2378E−02 | 2.0139E−01 | −8.1854E−02 | 1.2094E−02 |
| S10 | 5.3872E−02 | −3.5968E−02 | 3.7467E−01 | −1.5043E+00 | 3.2713E+00 | −4.1370E+00 | 3.1457E+00 | −1.3930E+00 | 2.9147E−01 |
| S11 | −2.2559E−01 | 7.2849E−02 | 2.5562E−02 | −5.1460E−02 | 2.9123E−02 | −8.5635E−03 | 1.4127E−03 | −1.2380E−04 | 4.4604E−06 |
| S12 | −5.1437E−01 | 4.6972E−01 | −3.8343E−01 | 2.5490E−01 | −1.3218E−01 | 5.2282E−02 | −1.5596E−02 | 3.4803E−03 | −5.7483E−04 |

Figure 16A:
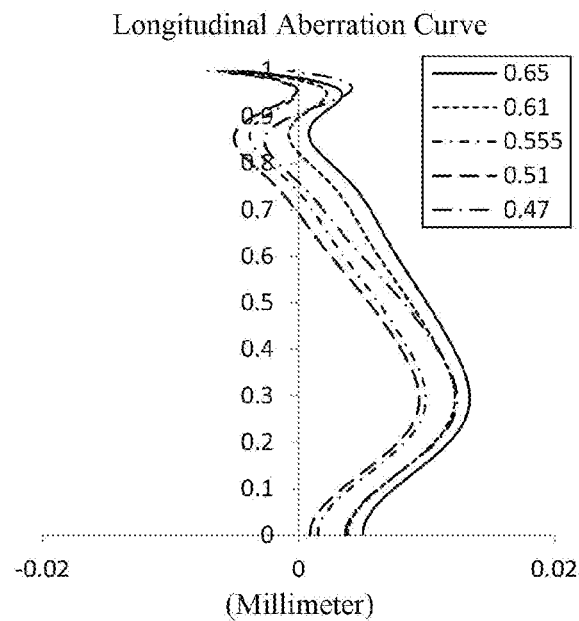
FIGS. 16A to 16D illustrate a longitudinal aberration curve, an astigmatic curve, a distortion curve, and a lateral color curve of the camera lens assembly of the example 8, respectively.
Figure 16B:
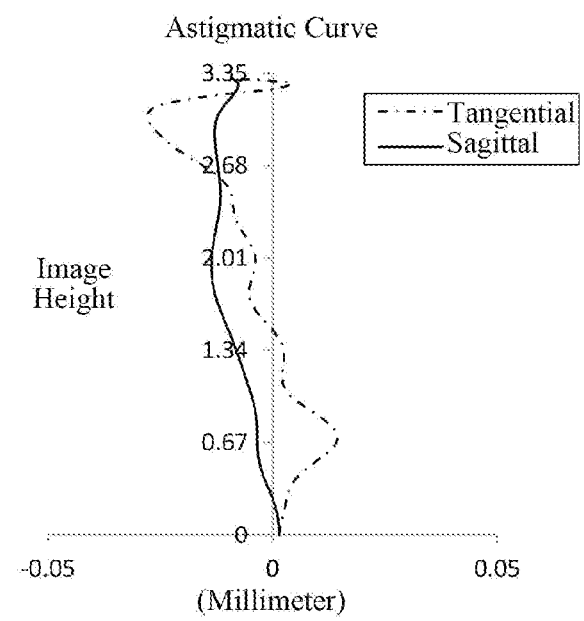
Figure 16C:
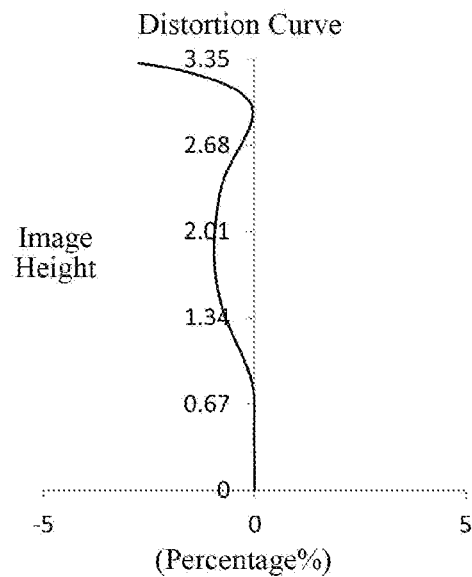
Figure 16D:
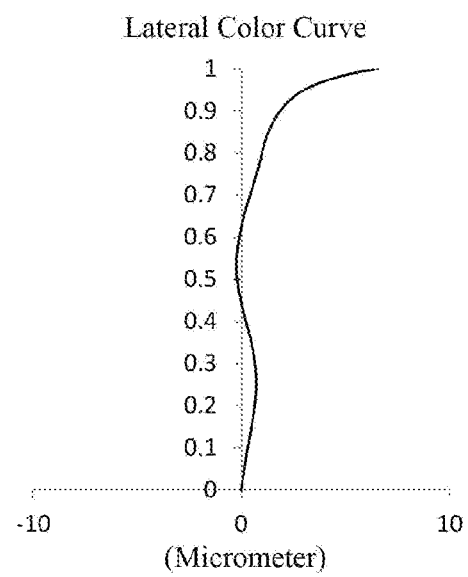

FIG. 16A illustrates a longitudinal aberration curve of the camera lens assembly according to example 8, representing deviations of focal points converged by light of different wavelengths after passing through the lens assembly. FIG. 16B illustrates an astigmatic curve of the camera lens assembly according to example 8, representing a curvature of a tangential plane and a curvature of a sagittal plane. FIG. 16C illustrates a distortion curve of the camera lens assembly according to example 8, representing amounts of distortion corresponding to different image heights. FIG. 16D illustrates a lateral color curve of the camera lens assembly according to example 8, representing deviations of different image heights on an imaging plane after light passes through the lens assembly. It can be seen from FIG. 16A to FIG. 16D that the camera lens assembly provided in example 8 may achieve good image quality.

In view of the above, examples 1 to 8 respectively satisfy the relationship shown in Table 17.

TABLE 17

| Condition/Example | 1 | 2 | 3 | 4 | 5 | 6 | 7 | 8 |
|---|---|---|---|---|---|---|---|---|
| TTL/ImgH | 1.31 | 1.32 | 1.31 | 1.30 | 1.31 | 1.32 | 1.34 | 1.33 |
| $\tan^2$(Semi-FOV) * f23 (mm) | 4.86 | 5.08 | 5.57 | 6.05 | 7.22 | 9.40 | 5.96 | 5.52 |
| f/R12 | 3.89 | 3.81 | 3.73 | 5.33 | 5.45 | 3.47 | 4.02 | 3.12 |
| (R5 + R6)/(R5 − R6) | 3.39 | 3.69 | 3.16 | 3.09 | 2.37 | 2.19 | 5.32 | 5.31 |
| CT4/T45 | 1.75 | 1.47 | 2.01 | 1.02 | 1.03 | 1.99 | 2.99 | 3.96 |
| ΣAT/TD | 0.21 | 0.21 | 0.20 | 0.22 | 0.21 | 0.19 | 0.21 | 0.227 |
| (SAG51 + SAG52)/(SAG51 − SAG52) | −1.96 | −2.00 | −1.84 | −1.73 | −1.80 | −2.69 | −1.37 | −1.22 |
| DT62/DT11 | 4.40 | 4.55 | 4.51 | 4.55 | 4.53 | 4.53 | 4.58 | 4.75 |
| ET6/ET3 | 1.79 | 1.54 | 1.68 | 1.62 | 1.54 | 1.59 | 1.42 | 2.58 |
| f234/f123 | 1.65 | 2.00 | 2.29 | 1.40 | 1.55 | 2.13 | 4.87 | 2.84 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the camera lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A camera lens assembly, sequentially from an object side to an image side of the camera lens assembly along an optical axis, comprising:
   a first lens having refractive power;
   a second lens having positive refractive power and a convex image-side surface;
   a third lens having negative refractive power and a convex object-side surface and a concave image-side surface;
   a fourth lens having negative refractive power;
   a fifth lens having refractive power and a convex image-side surface; and
   a sixth lens having refractive power, a convex object-side surface and a concave image-side surface,
   wherein 4.00 mm<$\tan^2$(Semi-FOV)*f23<10.00 mm,
   where Semi-FOV is half of a maximum field-of-view of the camera lens assembly, and f23 is a combined focal length of the second lens and the third lens; and
   wherein 4.00<DT62/DT11<5.00,
   where DT62 is a maximum effective radius of the image-side surface of the sixth lens, and DT11 is a maximum effective radius of an object-side surface of the first lens.

2. The camera lens assembly according to claim 1, wherein TTL/ImgH<1.36,
   where TTL is a distance along the optical axis from an object-side surface of the first lens to an imaging plane of the camera lens assembly, and ImgH is half of a diagonal length of an effective pixel area on the imaging plane of the camera lens assembly.

3. The camera lens assembly according to claim 1, wherein 3.00<f/R12<6.00,
   where f is a total effective focal length of the camera lens assembly, and R12 is a radius of curvature of the image-side surface of the sixth lens.

4. The camera lens assembly according to claim 1, wherein 2.00<(R5+R6)/(R5−R6)<6.00,
   where R5 is a radius of curvature of the object-side surface of the third lens, and R6 is a radius of curvature of the image-side surface of the third lens.

5. The camera lens assembly according to claim 1, wherein 1.00<CT4/T45<4.00,
   where CT4 is a center thickness of the fourth lens along the optical axis, and T45 is a spaced interval between the fourth lens and the fifth lens along the optical axis.

6. The camera lens assembly according to claim 1, wherein ΣAT/TD<0.23,
   where TD is a distance along the optical axis from an object-side surface of the first lens to the image-side surface of the sixth lens, and ΣAT is a sum of spaced intervals along the optical axis between each two adjacent lenses of the first lens to the sixth lens.

7. The camera lens assembly according to claim 1, wherein −3.00<(SAG51+SAG52)/(SAG51−SAG52)<−1.00,
   where SAG51 is a distance along the optical axis from an intersection of an object-side surface of the fifth lens and the optical axis to a vertex of an effective radius of the object-side surface of the fifth lens, and SAG52 is a distance along the optical axis from an intersection of the image-side surface of the fifth lens and the optical axis to a vertex of an effective radius of the image-side surface of the fifth lens.

8. The camera lens assembly according to claim 1, wherein 1.00<ET6/ET3<3.00,
   where ET6 is an edge thickness of the sixth lens, and ET3 is an edge thickness of the third lens.

9. The camera lens assembly according to claim 1, wherein 1.00<f234/f123<5.00,
   where f123 is a combined focal length of the first lens, the second lens, and the third lens, and f234 is a combined focal length of the second lens, the third lens and the fourth lens.

10. The camera lens assembly according to claim 1, wherein the camera lens assembly further comprises a stop, and the stop is disposed between the object side and the first lens.

11. A camera lens assembly, sequentially from an object side to an image side of the camera lens assembly along an optical axis, comprising:
    a stop;
    a first lens having refractive power;
    a second lens having positive refractive power and a convex image-side surface;
    a third lens having negative refractive power and a convex object-side surface and a concave image-side surface;
    a fourth lens having negative refractive power;
    a fifth lens having refractive power and a convex image-side surface; and
    a sixth lens having refractive power, a convex object-side surface and a concave image-side surface,
    wherein TTL/ImgH<1.36,
    where TTL is a distance along the optical axis from an object-side surface of the first lens to an imaging plane of the camera lens assembly, and ImgH is half of a diagonal length of an effective pixel area on the imaging plane of the camera lens assembly; and
    wherein 4.00<DT62/DT11<5.00,
    where DT62 is a maximum effective radius of the image-side surface of the sixth lens, and DT11 is a maximum effective radius of an object-side surface of the first lens.

12. The camera lens assembly according to claim 11, wherein 3.00<f/R12<6.00,
    where f is a total effective focal length of the camera lens assembly, and R12 is a radius of curvature of the image-side surface of the sixth lens.

13. The camera lens assembly according to claim 11, wherein 1.00<f234/f123<5.00, where f123 is a combined focal length of the first lens, the second lens, and the third lens, and f234 is a combined focal length of the second lens, the third lens and the fourth lens.

14. The camera lens assembly according to claim 11, wherein $2.00<(R5+R6)/(R5-R6)<6.00$,
where R5 is a radius of curvature of the object-side surface of the third lens, and R6 is a radius of curvature of the image-side surface of the third lens.

15. The camera lens assembly according to claim 11, wherein $1.00<CT4/T45<4.00$,
where CT4 is a center thickness of the fourth lens along the optical axis, and T45 is a spaced interval between the fourth lens and the fifth lens along the optical axis.

16. The camera lens assembly according to claim 11, wherein $\Sigma AT/TD<0.23$,
where TD is a distance along the optical axis from the object-side surface of the first lens to the image-side surface of the sixth lens, and $\Sigma AT$ is a sum of spaced intervals along the optical axis between each two adjacent lenses of the first lens to the sixth lens.

17. The camera lens assembly according to claim 11, wherein $-3.00<(SAG51+SAG52)/(SAG51-SAG52)<-1.00$,
where SAG51 is a distance along the optical axis from an intersection of an object-side surface of the fifth lens and the optical axis to a vertex of an effective radius of the object-side surface of the fifth lens, and SAG52 is a distance along the optical axis from an intersection of the image-side surface of the fifth lens and the optical axis to a vertex of an effective radius of the image-side surface of the fifth lens.

18. The camera lens assembly according to claim 11, wherein $1.00<ET6/ET3<3.00$,
where ET6 is an edge thickness of the sixth lens, and ET3 is an edge thickness of the third lens.

* * * * *